US010810590B2

(12) United States Patent
Fortin et al.

(10) Patent No.: US 10,810,590 B2
(45) Date of Patent: Oct. 20, 2020

(54) PAYMENT FACILITATION METHOD AND SYSTEM

(71) Applicant: MASTERCARD ASIA/PACIFIC PTE. LTD., Singapore (SG)

(72) Inventors: Frédéric Fortin, Brussels (BE); Rajat Maheshwari, Singapore (SG); Benjamin Charles Gilbey, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 239 days.

(21) Appl. No.: 15/847,100

(22) Filed: Dec. 19, 2017

(65) Prior Publication Data

US 2018/0174152 A1 Jun. 21, 2018

(30) Foreign Application Priority Data

Dec. 20, 2016 (SG) .................. SG10201610669R

(51) Int. Cl.
| | |
|---|---|
| *G06Q 20/40* | (2012.01) |
| *G10L 15/22* | (2006.01) |
| *G10L 17/22* | (2013.01) |
| *G10L 15/30* | (2013.01) |
| *G10L 17/00* | (2013.01) |

(52) U.S. Cl.
CPC ........ *G06Q 20/40145* (2013.01); *G10L 15/22* (2013.01); *G10L 17/22* (2013.01); *G10L 15/30* (2013.01); *G10L 17/00* (2013.01); *G10L 2015/223* (2013.01)

(58) Field of Classification Search
USPC ..................................... 705/35, 44
See application file for complete search history.

(56) References Cited

U.S. PATENT DOCUMENTS

| | | | | |
|---|---|---|---|---|
| 9,519,901 B1* | 12/2016 | Dorogusker | ......... | G06Q 20/401 |
| 2003/0216919 A1* | 11/2003 | Roushar | .................. | G06F 40/30 |
| | | | | 704/260 |
| 2014/0129357 A1* | 5/2014 | Goodwin | ............... | G06Q 30/02 |
| | | | | 705/16 |
| 2015/0081545 A1* | 3/2015 | Gissler | ................. | G06Q 20/322 |
| | | | | 705/44 |
| 2015/0081548 A1* | 3/2015 | Robinett | ................ | G06Q 20/32 |
| | | | | 705/44 |
| 2015/0363762 A1* | 12/2015 | Kimberg | .............. | G06Q 20/322 |
| | | | | 705/40 |
| 2016/0275506 A1* | 9/2016 | Salian | .................. | G06Q 20/204 |

OTHER PUBLICATIONS

Speech User Interface Guide IBM Chamberlain (Year: 2006).*
Voice-Based Communication: A V*IP Architecture and Its Revolutionary Implications for Business Chatterjee (Year: 2001).*

* cited by examiner

*Primary Examiner* — William E Rankins
(74) *Attorney, Agent, or Firm* — Harness, Dickey & Pierce, P.L.C.

(57) ABSTRACT

There is provided a client device, method and system for facilitating a payment from a customer to a merchant. Payment is carried out upon use of voice data for authentication of a user and subsequent transmission of a payment authorization message.

11 Claims, 14 Drawing Sheets

PAYMENT FACILITATION METHOD AND SYSTEM

CROSS-REFERENCE TO RELATED APPLICATION

This application claims the benefit of and priority to Singapore Patent Application No. 10201610669R filed Dec. 20, 2016. The entire disclosure of the above application is incorporated herein by reference.

FIELD

This present disclosure relates to methods and systems for facilitating a payment from a customer to a merchant, using a spoken payment command obtained from the customer.

BACKGROUND

This section provides background information related to the present disclosure which is not necessarily prior art.

Mobile payment services may allow customers to make cashless payments using a portable mobile device, such as a smart phone. The most widely adopted implementations rely on short range contactless communication between a customer's mobile device and a point of sale (POS) terminal, using protocols such as Near Field Communication (NFC) or Magnetic Secure Transmission (MST). The customer interacts with the POS terminal using their mobile device in place of a traditional payment card, such as by swiping, touching or waving their mobile device in close proximity of the POS terminal.

Mobile payments are typically performed using a digital wallet on the customer's mobile device, which can support multiple payment instruments, such as credit cards, debit cards, transit cards, prepaid cards, gift cards, or the like. The customer's mobile device may have different wallets which can support the same or different payment instruments. Some cards may be better suited for a particular transaction depending on the account benefits. For example, some cards may offer superior rewards points or cashback, or some cards may offer greater benefits for transactions with certain merchants or purchase categories. However, it can be difficult for the customer to remember which card will be best for every transaction, which can lead to a customer missing out on the benefits offered by different payment instruments in different payment scenarios.

Conventional mobile payment services may also require the customer to manually interact with the mobile device to confirm the transaction and provide authentication details (such as a personal identification number, password, pattern or biometric identifier, such as a fingerprint/retina scan) as part of the payment process. However, these additional steps can detract from the user experience and may discourage customers from adopting the service as their preferred payment mode.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

SUMMARY

This section provides a general summary of the disclosure, and is not a comprehensive disclosure of its full scope or all of its features. Aspects and embodiments of the disclosure are set out in the accompanying claims.

In a first aspect, there is provided a client device for facilitating a payment from a customer to a merchant, the client device being configured to: (a) obtain voice data indicative of a spoken payment command from the customer; (b) at least in part use the spoken payment command to: (i) cause authentication of the customer to be performed; (ii) determine a merchant identifier; and (iii) determine a payment instrument of the customer; (c) generate a payment authorization including an indication of the payment instrument; and (d) transmit the payment authorization request message to a merchant device of the merchant, the merchant device responding to the payment authorization request message by causing the payment from the payment instrument of the customer to the merchant to be performed in accordance with the payment authorization request message.

There is also provided a method for facilitating a payment from a customer to a merchant, the method being performed using a client device of the customer, the method including: (a) obtaining voice data indicative of a spoken payment command from the customer; (b) at least in part using the spoken payment command: (i) causing authentication of the customer to be performed; (ii) determining a merchant identifier; and (iii) determining a payment instrument of the customer; (c) generating a payment authorization request message including an indication of the payment instrument; and (d) transmitting the payment authorization request message to a merchant device of the merchant, the merchant device responding to the payment authorization request message by causing the payment from the payment instrument of the customer to the merchant to be performed in accordance with the payment authorization request message.

In another aspect, there is provided a method for facilitating a payment from a customer to a merchant, the method being performed using a merchant device of the merchant, the method including: a) receiving, from a client device of the customer, a payment authorization request message including an indication of a payment instrument of the customer, the payment authorization request message being generated in response to the client device obtaining voice data indicative of a spoken payment command from the customer and at least in part using the spoken payment command to: (i) cause authentication of the customer to be performed; (ii) determine a merchant identifier; and (iii) determine the payment instrument of the customer; b) generating, in response to the payment authorization request message, a payment request based on the payment authorization request message and a payment amount for the payment; and c) transmitting the payment request to a payment server to cause the payment from the payment instrument of the customer to the merchant to be performed in accordance with the payment request.

In a further aspect, there is provided a merchant device for facilitating a payment from a customer to a merchant, the merchant device being configured to: a) receive, from a client device of the customer, a payment authorization request message including an indication of a payment instrument of the customer, the payment authorization request message being generated in response to the client device obtaining voice data indicative of a spoken payment command from the customer and at least in part using the spoken payment command to: i) cause authentication of the customer to be performed; ii) determine a merchant identifier; and iii) determine the payment instrument of the customer; b) generate, in response to the payment authorization request message, a payment request based on the payment authorization request message and a payment amount for the payment; and c) transmit the payment request to a payment server to cause the payment from the payment instrument of the customer to the merchant to be performed in accordance with the payment request.

There is also provided a method for facilitating a payment from a customer to a merchant, the method being performed using a client device of the customer and a merchant device of the merchant, the method including: a) in the client device: i) obtaining voice data indicative of a spoken payment command from the customer; ii) at least in part using the voice data indicative of the spoken payment command: (1) causing authentication of the customer to be performed; (2) determining a merchant identifier; and (3) determining a payment instrument of the customer; and iii) generating a payment authorization request message including an indication of the payment instrument; and b) in a merchant device: i) receiving the payment authorization request message from the client device; ii) generating, in response to the payment authorization request message, a payment request based on the payment authorization request message and a payment amount for the payment; and iii) transmitting the payment request to a payment server to cause the payment from the payment instrument of the customer to the merchant to be performed in accordance with the payment request.

There is also provided a system for facilitating a payment from a customer to a merchant, the system including: a) a client device configured to: (i) obtain voice data indicative of a spoken payment command from the customer; (ii) at least in part using the voice data indicative of the spoken payment command: (1) cause authentication of the customer to be performed; (2) determine a merchant identifier; and (3) determine a payment instrument of the customer; and (iii) generate a payment authorization request message including an indication of the payment instrument; and (b) a merchant device configured to: (i) receive the payment authorization request message from the client device; (ii) generate, in response to the payment authorization request message, a payment request based on the payment authorization request message and a payment amount for the payment; and (iii) transmit the payment request to a payment server to cause the payment from the payment instrument of the customer to the merchant to be performed in accordance with the payment request.

In a further aspect, there is provided a method for generating a payment preference for payments from a customer to a merchant, the method being performed using a client device of the customer, the method including: (a) obtaining voice data indicative of a spoken merchant name from the customer; (b) determining a merchant identifier corresponding to the voice data indicative of the spoken merchant name based on speech recognition performed on the spoken merchant name; (c) determining a customer selection of a payment instrument of the customer for payments to the merchant; and (d) generating a payment preference for the merchant identifier based on the selected payment instrument.

There is also provided a non-transitory computer readable storage medium embodying thereon a program of computer readable instructions which, when executed by one or more processors of a client device in communication with at least one merchant device, cause the client device to carry out a method for facilitating a payment from a customer to a merchant, the method embodying the steps of: a) obtaining voice data indicative of a spoken payment command from the customer; b) at least in part using the spoken payment command: i) causing authentication of the customer to be performed; ii) determining a merchant identifier; and iii) determining a payment instrument of the customer; c) generating a payment authorization request message including an indication of the payment instrument; and d) transmitting the payment authorization request message to a merchant device of the merchant, the merchant device responding to the payment authorization request message by causing the payment from the payment instrument of the customer to the merchant to be performed in accordance with the payment authorization request message.

In a final aspect, there is provided a non-transitory computer readable storage medium embodying thereon a program of computer readable instructions which, when executed by one or more processors of a client device in communication with at least one merchant device, cause the client device to carry out a method for generating a payment preference for payments from a customer to a merchant, the method embodying the steps of: a) obtaining voice data indicative of a spoken merchant name from the customer; b) determining a merchant identifier corresponding to the voice data indicative of the spoken merchant name based on speech recognition performed on the spoken merchant name; c) determining a customer selection of a payment instrument of the customer for payments to the merchant; and d) generating a payment preference for the merchant identifier based on the selected payment instrument.

Further areas of applicability will become apparent from the description provided herein. The description and specific examples and embodiments in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. An example of the present disclosure will now be described with reference to the accompanying drawings, in which.

Corresponding reference numerals indicate corresponding parts throughout the several views of the drawings.

DETAILED DESCRIPTION

Embodiments of the present disclosure will be described, by way of example only, with reference to the drawings. The description and specific examples included herein are intended for purposes of illustration only and are not intended to limit the scope of the present disclosure. That said, an example of a method for facilitating a payment from a customer to a merchant will now be described with reference to FIG. 1.

Figure 1:
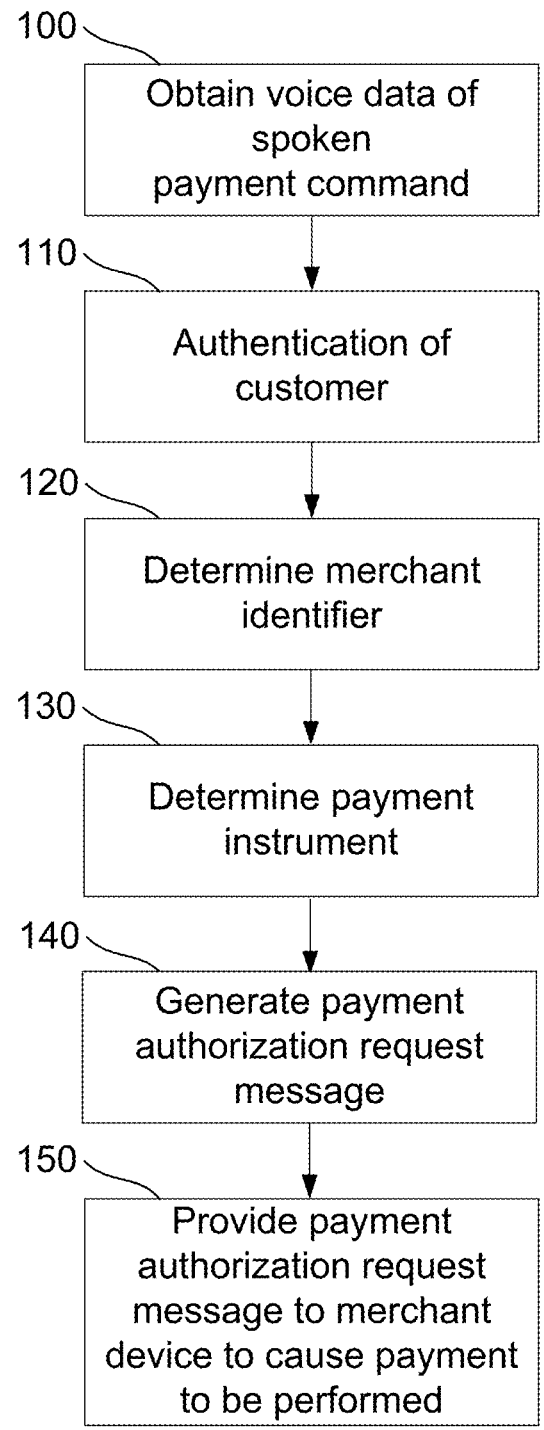
FIG. 1 is a flow chart of an example of a method for facilitating a payment from a customer to a merchant.

The method, as exemplified in FIG. 1, is performed using a client device of the customer, which will communicate with a merchant device of the merchant. The client device and the merchant device will generally be in the form of electronic processing devices, suitable examples of which will be described in further detail below. Depending on the implementation of the method, the devices may also be configured to communicate with other electronic processing devices, such as an application server or a payment server.

For the purpose of this example, it is assumed that the client device may be a suitably configured mobile device, such as a smart phone that is carried by the customer, whilst the merchant device may be a suitably configured point-of-sale device, which may or may not be a mobile device depending on the particular context in which payments are to be approved. For instance, a merchant operating a portable business may also use a mobile device, such as a smart phone, but a merchant having a fixed place of business may use a POS terminal or a stationary computing device, such as a suitably programmed PC, although a mobile device, such as a tablet or smart phone, might nevertheless be used in such a fixed place of business. In any event, for the purpose of this example, it will be assumed that the merchant device is located in a place of business of the merchant. However, it should be appreciated that a range of alternative forms of client and merchant devices may be used.

The devices may execute application software for enabling functionalities of the method, and different application software may be used by different devices. For the purpose of this example, it is assumed that the customer is a registered user of the application software and that the application software is appropriately configured for use with the method. Furthermore, it is assumed that the customer has associated at least one payment instrument (such as a bank account, credit card account, gift card, or the like) with the customer's registration to allow payments to be made. Payment instrument tokens for each associated payment instrument may be stored in a mobile wallet of the customer. It is also assumed that the merchant is able to accept mobile payments via their acquiring bank.

The method commences at step 100 when a spoken payment command is obtained from the customer. For instance, the spoken payment command may be obtained when the customer wishes to initiate a mobile payment using the client device. Voice data of the spoken payment command may be obtained using a microphone or any other suitable sensor of the client device. The spoken payment command will be used, at least in part, in performing the subsequent steps 110, 120 and 130.

In step 110, the spoken payment command may be used to perform authentication of the customer, at least in part using the spoken payment command. For example, this may involve performing voice authentication and/or speech recognition using the voice data to authenticate the customer's identity before allowing the payment to be completed. It will be appreciated that this may remove the need for the customer to manually interact with the client device to provide authentication details as per conventional mobile payment techniques.

In step 120, a merchant identifier may be determined, at least in part using the spoken payment command. In some embodiments, the customer may speak the merchant's name or a substantial part thereof as part of the spoken payment command, and the merchant identifier may be determined based on speech recognition performed on the voice data of the spoken payment command. Alternatively, the customer may speak a merchant category as part of the spoken payment command and this may be used to determine the merchant identifier, which may identify a group of merchants rather than a single merchant in that case. However, in other embodiments, the spoken payment command may not necessarily include a merchant name or category but may simply include a spoken confirmation to initiate a payment to a suggested merchant that may be identified based on other factors, such as the geolocation of the client device or wireless communication with the merchant device.

In step 130, a payment instrument of the customer may be determined. Again, this may be performed at least in part using the spoken payment command. Some implementations may involve having the customer identify a desired payment instrument as part of the spoken payment command, to thereby allow the payment instrument to also be determined based on speech recognition performed on the voice data of the spoken payment command. However, other implementations may involve determining the payment instrument based on the merchant identifier determined in step 120. For instance, in some examples, the payment instrument may be determined based on a payment preference associated with the merchant identifier. In other examples, the payment instrument may be determined based on any offers associated with the merchant identifier for available payment instruments in the customer's mobile wallet. In any event, the final payment instrument to be used for the payment will be determined based on the spoken payment command.

It should be appreciated that steps 110, 120 and 130 will not necessarily be conducted in the specific order as described above and depicted in FIG. 1. In any event, upon completion of the authentication of the customer and the determination of the merchant identifier and the payment instrument in response to the spoken payment command being obtained, the method will involve generating a payment authorization request message at step 140. The payment authorization request message will include at least an indication of the payment instrument determined in step 130.

Finally, in step 150, the payment authorization request message will be provided to the merchant device of the merchant. For example, this may involve the use of wireless communication between the client device and the merchant device as per conventional mobile payment techniques, such as by using NFC or MST contactless technologies depending on the capabilities of the client device and the merchant device. Technologies not based on wireless communication like, for example, visual indicia can also be used for payment authorization. Upon receipt of the payment authorization request message, the merchant device may respond by causing the payment from the payment instrument of the customer to the merchant to be performed in accordance with the payment authorization request message. The subsequent transaction process may utilize generally conventional techniques.

It will be appreciated that the above described method can provide significant advantages compared to conventional mobile payment processes. For example, the method allows authentication of the customer to be performed using voice authentication and/or speech recognition and thus removes the need for the customer to manually interact with their client device to provide conventional forms of authentication information (such as a personal identification number, password, pattern or biometric identifier, such as a fingerprint/retina scan) as part of the payment process. This can help to avoid a substantial point of friction from the payment process.

Furthermore, the method also allows speech recognition techniques to be more broadly applied to the selection of the best payment instrument of the customer for a particular payment. As mentioned above, the merchant identifier may be determined or confirmed based on the customer's spoken payment command which can be used to determine a suitable payment instrument of the customer, such as with regard to a payment preference or a selection based on the best offers associated with the customer's payment instruments for the particular merchant identifier. In other implementations, a preferred payment card/wallet may be determined depending on a category of the merchant, geolocation or other additional intelligence, but in general this will still be at least partially based on or triggered by the customer's spoken payment command.

In any event, the method enables a customer to consistently use the best card for every transaction, which can enhance the user experience and reduce the overhead of remembering which card to use for different merchants or types of transactions.

As will be described in further detail below, speech recognition techniques may also be applied to improve the learning and intelligence of engine. For example, the customer's payment preferences may be initially set using speech recognition, and this may be used to train the system to more reliably act on later spoken payment commands.

Optional implementation features of the method will now be described.

As mentioned above, the method may include causing the authentication to be performed at least partially based on voice authentication performed on the voice data of the spoken payment command. This may involve the use of known voice biometrics or speaker recognition techniques, whereby acoustic patterns in the customer's speech in the spoken payment command can be used to verify the identity of the customer. The use of voice authentication will typically require that the customer has previously trained the system to recognize the customer's voice, which may once again utilize known techniques.

As far as the step of determining the merchant identifier is concerned, this may be at least partially based on speech recognition performed on the voice data of the spoken payment command.

For example, the merchant identifier may be determined based on speech recognition of at least part of a spoken merchant name obtained from the customer as part of the voice data of the spoken payment command. In such cases, the merchant identifier may be determined by comparing the at least part of the spoken merchant name with respective merchant names associated with a plurality of merchant identifiers. In practice, this may involve the use of a database or list in which details of participating merchants are stored, including unique merchant identifiers and associated merchant names, or parts thereof. When voice data of a spoken payment command is obtained, speech recognition may be performed to extract words or phrases that may relate to the spoken merchant name and comparing these to the stored merchant details to thereby allow the merchant identifier corresponding to the spoken merchant name to be determined.

In some examples, the merchant identifier may be determined based on speech recognition of at least part of a spoken merchant category obtained from the customer as part of the spoken payment command. Accordingly, it should be appreciated that the merchant identifier may not directly correspond to a single merchant but may instead correspond to a category or grouping of a plurality of merchants. The customer may set payment preferences that are broadly applicable to categories or groups of merchants such that it will not be necessary to specifically identify an individual merchant as part of the method. Thus it should be understood that references to a merchant identifier herein can refer to any means of identifying one or more merchants for the purpose of enabling an appropriate payment instrument of the customer to be determined for use in payments to the one or more merchants.

In other examples, the merchant identifier may be determined based on speech recognition of a spoken confirmation obtained from the customer as part of the voice data of the spoken payment command. It will be appreciated that this still involves determining the merchant identifier at least in part using the voice data of the spoken payment command, but a possible merchant identifier may be determined for confirmation using other techniques along with speech recognition.

For instance, some versions of the method may include presenting a payment suggestion to the customer and obtaining the spoken confirmation from the customer in response to the payment suggestion. Voice recognition may be performed to process the spoken confirmation to thereby confirm that this constitutes acceptance of the payment suggestion, which may be derived using inputs other than the spoken payment command.

The above mentioned payment suggestion may include a suggested merchant identifier and an indication of a payment instrument of the customer associated with the suggested merchant identifier. The payment suggestion may be presented to the customer in the form of a notification on the client device so that the customer can respond with a spoken payment command including spoken confirmation of the suggested merchant identifier and the indication of a payment instrument as presented.

In some implementations, the suggested merchant identifier may be determined based on a client device geolocation. For example, the method may include selecting the suggested merchant identifier from a plurality of merchant identifiers each being associated with a respective merchant geolocation, based on a comparison between the client device geolocation and the respective merchant geolocations. These respective merchant geolocations may be stored in the list or database storing the merchant details as discussed above. In some instances, the comparison may be made automatically in response to the client entering a merchant's place of business, so that the client may be presented with a payment suggestion as a pre-emptive notification on the client device, such that the payment process can be conveniently initiated by the customer providing the spoken confirmation as part of the spoken payment command when the customer is ready to perform the payment.

In other implementations, the suggested merchant identifier may be determined based on wireless communication with the merchant device. For instance, when the customer enters the merchant's place of business, the client device may establish a wireless communication connection with the merchant device, which may allow the merchant device to transfer merchant information to the client device. This may allow the client device to determine the merchant identifier based on the merchant information. It will be appreciated that requiring the customer to provide spoken confirmation of the suggested merchant identifier will still be advantageous, especially in locations where multiple merchants may exist in close proximity. The wireless communication technology that may be used is not particularly limited, but could include Bluetooth® Low Energy (BLE), WiFi, Zigbee® or NFC.

In the event that the customer does not agree with the payment suggestion, the customer could override the payment suggestion by providing a more detailed spoken payment command including the merchant name to allow the merchant identifier to be determined using speech recognition as discussed above, rather than merely providing a spoken confirmation of the payment suggestion.

Determining the payment instrument may include selecting the payment instrument from a plurality of available payment instruments. This may be achieved in a range of different ways, examples of which will now be discussed.

In some implementations, the payment instrument may be selected based on a customer selection of the payment instrument. This could involve selecting the payment instrument based on voice recognition performed on the voice data of the spoken payment command. The customer's spoken payment command could include a spoken confirmation for a suggested payment instrument as discussed above, or alternatively, the voice data of the spoken payment command could include a spoken payment instrument name corresponding to the customer's desired payment instrument for the payment.

In other implementations, the payment instrument may be selected in accordance with a payment preference associated with the merchant identifier. Accordingly, once a merchant identifier has been determined, at least in part using the voice data of the spoken payment command as discussed above, the payment preference associated with the merchant identifier can be accessed and used to select the payment instrument in accordance with the payment preference. As mentioned above, the customer may set payment preferences for particular merchants or categories/groups of merchants. In general, a payment preference will involve a selection of a particular payment instrument for use with payments to the associated merchant/category/group. In some examples, the payment preference may be conditional on parameters such as the particular day of the week. For instance, a customer may set a payment preference for a merchant such that a first payment instrument will be used on weekdays and a second payment instrument will be used on weekends. It will be appreciated that a variety of parameters may be used in this fashion to effectively define rules on which payment instruments should be used in particular payment scenarios with particular merchants.

In some implementations, the payment instrument may be selected based on an assessment of any offers associated with the merchant identifier for the available payment instruments. This may involve accessing stored payment instrument details including offer details for particular merchants or categories/groups of merchants and determining whether any offer details apply to the determined merchant identifier. If multiple payment instruments have applicable offers, these may be compared to determine which offer will provide the greatest benefit to the customer, and the payment instrument may be selected accordingly.

In some cases, the different approaches to selecting the payment instrument as discussed above may be combined to provide enhanced functionality. For instance, the method may include selecting a first payment instrument in accordance with a payment preference associated with the merchant identifier, but also selecting a second payment instrument of the customer based on an assessment of any offers associated with the merchant identifier for the available payment instruments. Then the payment instrument may be finally determined based on a customer selection of one of the first and second payment instruments.

In practice, this scenario may involve presenting a notification or prompt on the client device informing the customer of the first and second payment instruments and requesting the customer to confirm the desired payment instrument. The notification may inform the customer of the reason for suggesting a second payment instrument despite the first payment instrument being selected in accordance with the payment preference, for example, by indicating that the second payment instrument will offer a greater discount or more reward points compared to the first payment instrument. The customer may then confirm whether to proceed with the payment based on the second payment instrument and thus override the customer's default payment preference for the particular merchant identifier. The customer's confirmation may involve a spoken confirmation that is processed using speech recognition, as discussed above, or alternatively may involve a selection using a graphical user interface of the client device.

The payment authorization request message may be provided to the merchant device using wireless communication between the client device and merchant device. It will be appreciated that a wide range of wireless communication protocols may be used, but in general it will be preferred to use similar techniques as conventional mobile payment processes. This may allow the same mobile payment infrastructure as conventional mobile payment processes to also be utilized by implementations of the method, and thus avoid the need for customers and merchants to obtain devices with special hardware capabilities in order to use the method. Accordingly, it may be desirable to provide the payment authorization to the merchant device using near field communication (NFC), which is currently a de facto standard technology for mobile payments. In such examples using NFC, the client device and merchant device should therefore be NFC capable devices, and the payment authorization request message may be provided by the customer swiping, touching or waving their client device, which may be a smart phone or the like, in close proximity of the merchant device, which may be a suitably configured POS terminal, or the like.

The merchant device may be configured to respond to the payment authorization request message by generating a payment request based on the payment authorization request message and a payment amount for the payment. Subsequently, the merchant device may cause the payment to be performed by providing the payment request to a payment server, which may be operated by a payment service provider. It will be appreciated that the steps of the method involving the payment request can be carried out using generally standard payment processes, which will be readily understood by those skilled in the art and will therefore not be discussed at length herein.

It will be appreciated that a client device for facilitating a payment from a customer to a merchant in accordance with embodiments of the above described method will be configured to: obtain voice data of a spoken payment command from the customer; at least in part use the voice data of the spoken payment command to cause authentication of the customer to be performed, determine a merchant identifier, and determine a payment instrument of the customer; generate a payment authorization request message including an indication of the payment instrument; and provide the payment authorization request message to a merchant device of the merchant, the merchant device responding to the payment authorization request message by causing the payment from the payment instrument of the customer to the merchant to be performed in accordance with the payment authorization request message.

From the perspective of the merchant device, the above described method may be broadly described as including: receiving, from a client device of the customer, a payment authorization request message including an indication of a payment instrument of the customer, the payment authorization request message being generated in response to the client device obtaining voice data of a spoken payment command from the customer and at least in part using the voice data of the spoken payment command to cause authentication of the customer to be performed, determine a merchant identifier, and determine the payment instrument of the customer; generating, in response to the payment authorization request message, a payment request based on the payment authorization request message and a payment amount for the payment; and providing the payment request to a payment server to cause the payment from the payment instrument of the customer to the merchant to be performed in accordance with the payment request.

Accordingly, it will be appreciated that a merchant device for facilitating a payment from a customer to a merchant in accordance with the above described method will be configured to: receive, from a client device of the customer, a payment authorization request message including an indication of a payment instrument of the customer, the payment authorization request message being generated in response to the client device obtaining a voice data of a spoken payment command from the customer and at least in part using the spoken payment command to cause authentication of the customer to be performed, determine a merchant identifier, and determine the payment instrument of the customer; generate, in response to the payment authorization request message, a payment request based on the payment authorization request message and a payment amount for the payment; and provide the payment request to a payment server to cause the payment from the payment instrument of the customer to the merchant to be performed in accordance with the payment request.

The overall method, including the specific actions of the client device and the merchant device, may also be defined as including the following. In the client device, the following steps are performed: obtaining voice data of a spoken payment command from the customer; at least in part using the voice data of the spoken payment command to cause authentication of the customer to be performed, determining a merchant identifier; and determine a payment instrument of the customer; and generating a payment authorization request message including an indication of the payment instrument. In the merchant device, the following steps are performed: receiving the payment authorization from the client device; generating, in response to the payment authorization request message, a payment request based on the payment authorization request message and a payment amount for the payment; and providing the payment request to a payment server to cause the payment from the payment instrument of the customer to the merchant to be performed in accordance with the payment request.

Thus, a system for facilitating a payment from a customer to a merchant may be defined as including: a client device configured to: obtain voice data of a spoken payment command from the customer; at least in part use the voice data of the spoken payment command to cause authentication of the customer to be performed, determine a merchant identifier, and determine a payment instrument of the customer; and generate a payment authorization request message including an indication of the payment instrument; and a merchant device configured to: receive the payment authorization request message from the client device; generate, in response to the payment authorization request message, a payment request based on the payment authorization request message and a payment amount for the payment; and provide the payment request to a payment server to cause the payment from the payment instrument of the customer to the merchant to be performed in accordance with the payment request.

As discussed above, some implementations may utilize a payment preference for determining which payment instrument to use for particular merchants or categories/groups thereof. Accordingly, the client device may also be used to perform a method for generating a payment preference for payments from the customer to the merchant. Such a method may include: obtaining voice data of a spoken merchant name from the customer; determining a merchant identifier corresponding to the voice data of the spoken merchant name based on speech recognition performed on the voice data of the spoken merchant name; determining a customer selection of a payment instrument of the customer for payments to the merchant; and generating a payment preference for the merchant identifier based on the selected payment instrument. In some examples, the customer selection of the payment instrument is determined by obtaining voice data of a spoken payment instrument name from the customer and determining a payment instrument corresponding to the voice data of the spoken payment instrument name based on speech recognition performed on the voice data of the spoken payment instrument name. A more detailed practical example of a method for generating a payment preference will be described in due course.

In one example, the process is performed by one or more processing systems operating as part of a distributed architecture, an example of which will now be described with reference to FIG. 2.

In this example, the arrangement includes a number of processing systems 201, 203 interconnected via one or more communications networks, such as the Internet 202, and/or a number of local area networks (LANs) 204. It will be appreciated that the configuration of the networks 202, 204 are for the purpose of example only, and in practice, the processing systems 201, 203 can communicate via any appropriate mechanism, such as via wired or wireless connections, including, but not limited to mobile networks, private networks, such as an 802.11 networks, the Internet, LANs, WANs, or the like, as well as via direct or point-to-point connections, such as Bluetooth®, or the like.

The nature of the processing systems 201, 203 and their functionality will vary depending on their particular requirements. In one particular example, the processing systems 201, 203 represent servers and clients, although this is not essential and is used primarily for the purpose of illustration.

Figure 3:
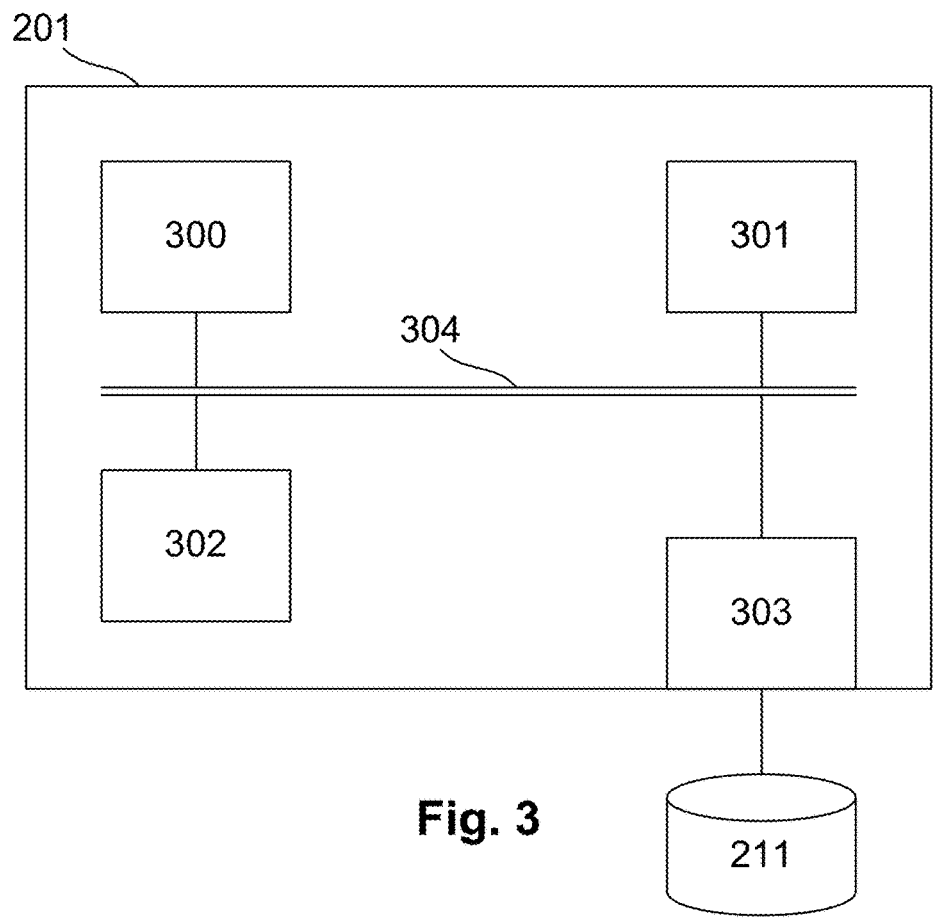
FIG. 3 is a schematic diagram of an example of a server processing system.

An example of a suitable processing system 201 is shown in FIG. 3. In this example, the processing system 201 includes an electronic processing device, such as at least one microprocessor 300, a memory 301, an optional input/output device 302, such as a keyboard and/or display, and an external interface 303, interconnected via a bus 304 as shown. In this example, the external interface 303 can be utilized for connecting the processing system 201 to peripheral devices, such as the communications networks 202, 204, databases 211, other storage devices, or the like. Although a single external interface 303 is shown, this is for the purpose of example only, and in practice multiple interfaces using various methods (e.g., Ethernet®, serial, USB, wireless, or the like) may be provided.

In use, the microprocessor 300 executes instructions in the form of applications software stored in the memory 301 to perform required processes, such as communicating with other processing systems 201, 203. Thus, actions performed by a processing system 201 are performed by the processor 300 in accordance with instructions stored as applications software in the memory 301 and/or input commands received via the I/O device 302, or commands received from other processing systems 201, 203. The applications software may include one or more software modules, and may be executed in a suitable execution environment, such as an operating system environment, or the like.

Accordingly, it will be appreciated that the processing systems 201 may be formed from any suitable processing system, such as a suitably programmed computer system, PC, web server, network server, or the like. In one particular example, the processing system 201 is a standard processing system, such as a 32-bit or 64-bit Intel® Architecture based processing system, which executes software applications stored on non-volatile (e.g., hard disk) storage, although this is not essential. However, it will also be understood that the processing systems 201 could be or could include any electronic processing device, such as a microprocessor, microchip processor, logic gate configuration, firmware optionally associated with implementing logic, such as an FPGA (Field Programmable Gate Array), or any other electronic device, system or arrangement.

Figure 4:
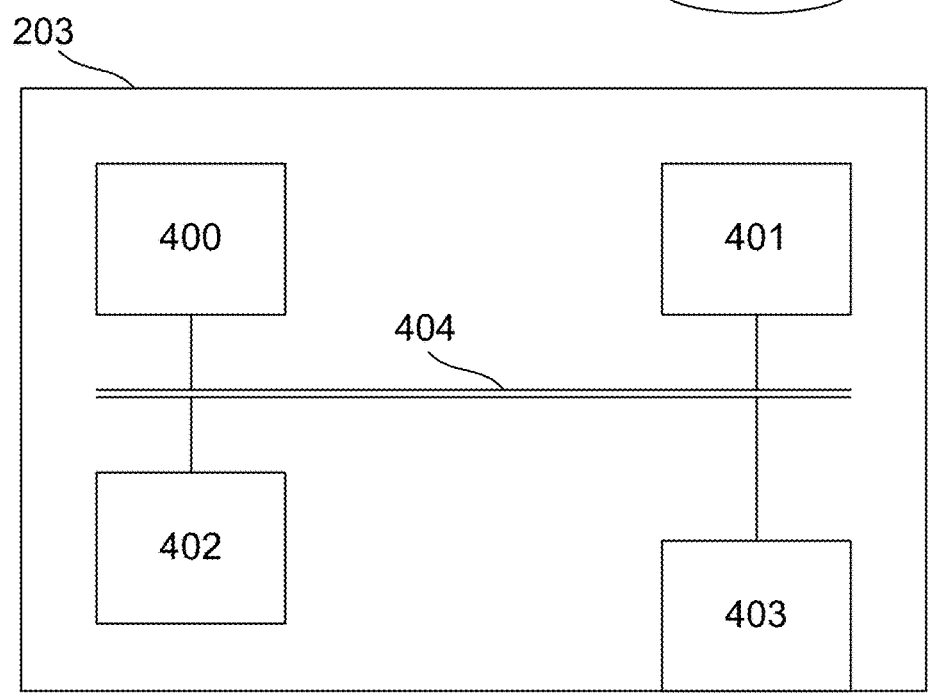
FIG. 4 is a schematic diagram of an example of a client processing system.

As shown in FIG. 4, in one example, the processing systems 203 include an electronic processing device, such as at least one microprocessor 400, a memory 401, an input/output device 402, such as a keyboard and/or display, and an external interface 403, interconnected via a bus 404, as shown. In this example, the external interface 403 can be utilized for connecting the processing system 203 to peripheral devices, such as the communications networks 202, 204, databases, other storage devices, or the like. Although a single external interface 403 is shown, this is for the purpose of example only, and in practice multiple interfaces using various methods (e.g., Ethernet®, serial, USB, wireless, or the like) may be provided.

In use, the microprocessor 400 executes instructions in the form of applications software stored in the memory 401 to perform required processes, for example, to allow communication with other processing systems 201, 203. Thus, actions performed by a processing system 203 are performed by the processor 400 in accordance with instructions stored as applications software in the memory 401 and/or input commands received from a user via the I/O device 402. The applications software may include one or more software modules, and may be executed in a suitable execution environment, such as an operating system environment, or the like.

Accordingly, it will be appreciated that the processing systems 203 may be formed from any suitable processing system, such as a suitably programmed PC, Internet terminal, lap-top, hand-held PC, smart phone, PDA, tablet, or the like. Thus, in one example, the processing system 203 is a standard processing system, such as a 32-bit or 64-bit Intel® Architecture based processing system, which executes software applications stored on non-volatile (e.g., hard disk) storage, although this is not essential. However, it will also be understood that the processing systems 203 can be any electronic processing device, such as a microprocessor, microchip processor, logic gate configuration, firmware optionally associated with implementing logic, such as an FPGA (Field Programmable Gate Array), or any other electronic device, system or arrangement.

It will also be noted that whilst the processing systems 201, 203 are shown as single entities, it will be appreciated that this is not essential, and instead one or more of the processing systems 201, 203 can be distributed over geographically separate locations, for example, by using processing systems provided as part of a cloud based environment.

For the purpose of the following detailed examples, it is assumed that the client devices used by the customers and the merchants will each be provided by processing systems 203 executing suitable application software. Furthermore, it is assumed that the client devices of the customers are capable of communicating with the client devices of the merchants (i.e., the merchant devices) using a suitable wireless communication protocol, such as NFC or the like, to thereby allow the payment authorization to be provided to the merchant device.

The process may be facilitated by one or more of the processing systems 201, acting as application servers, although it should be appreciated that this is not essential in all implementations of the method. Other processing systems 201 may act as payment servers operated by payment service providers, financial institutions, or the like. The payment servers will be responsible for actually performing the payments in a conventional manner, once the payments have been facilitated by the application servers in accordance with the method.

Figure 2:
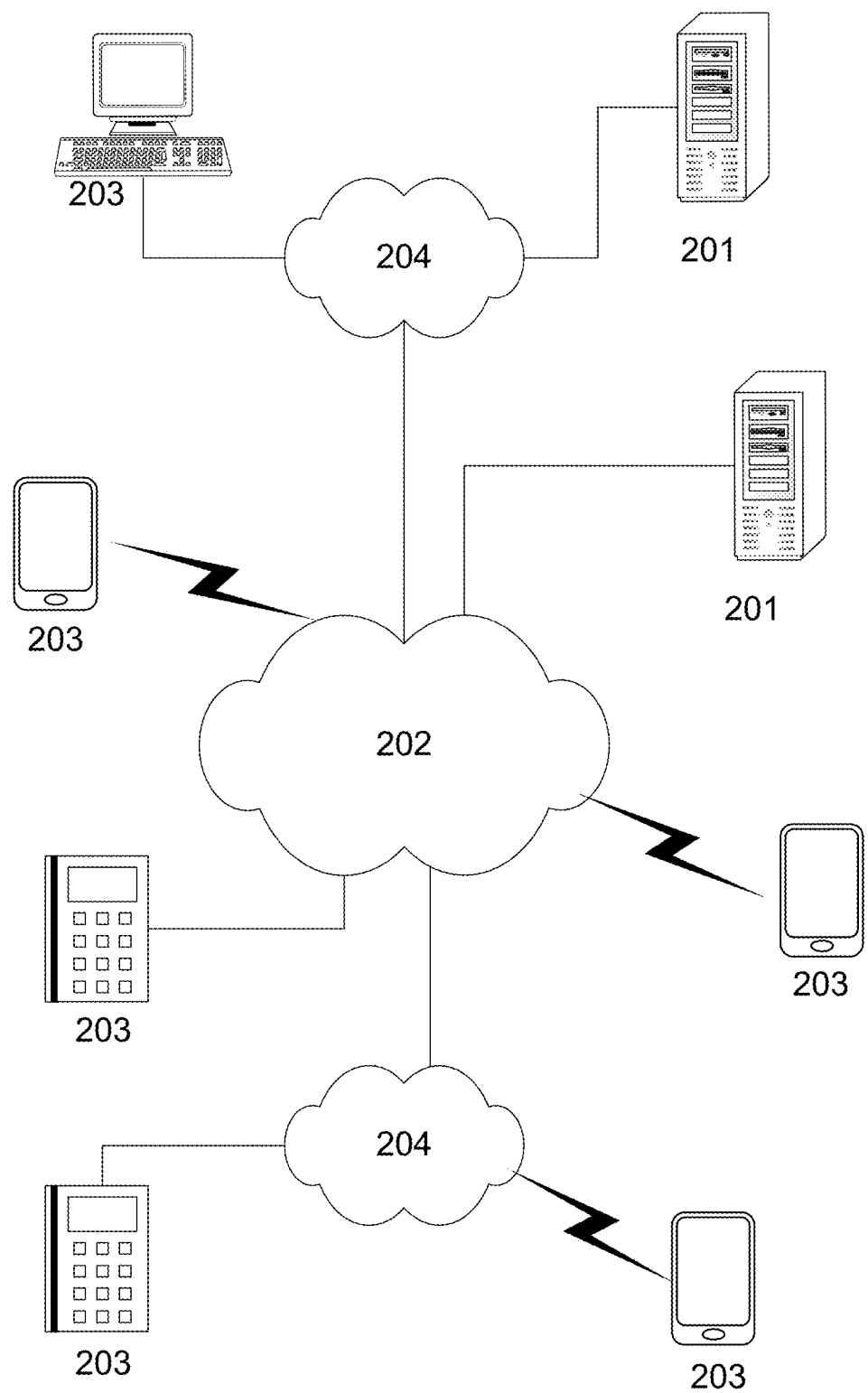
FIG. 2 is a schematic diagram of an example of a distributed computer architecture.

As depicted in FIG. 2, the processing systems 201 acting as application servers and/or payment servers and processing systems 203 acting as client devices and merchant devices may be connected to communications networks 202, 204 in different configurations, to allow communication between the different processing systems 201, 203 via the Internet 202.

Figure 5:
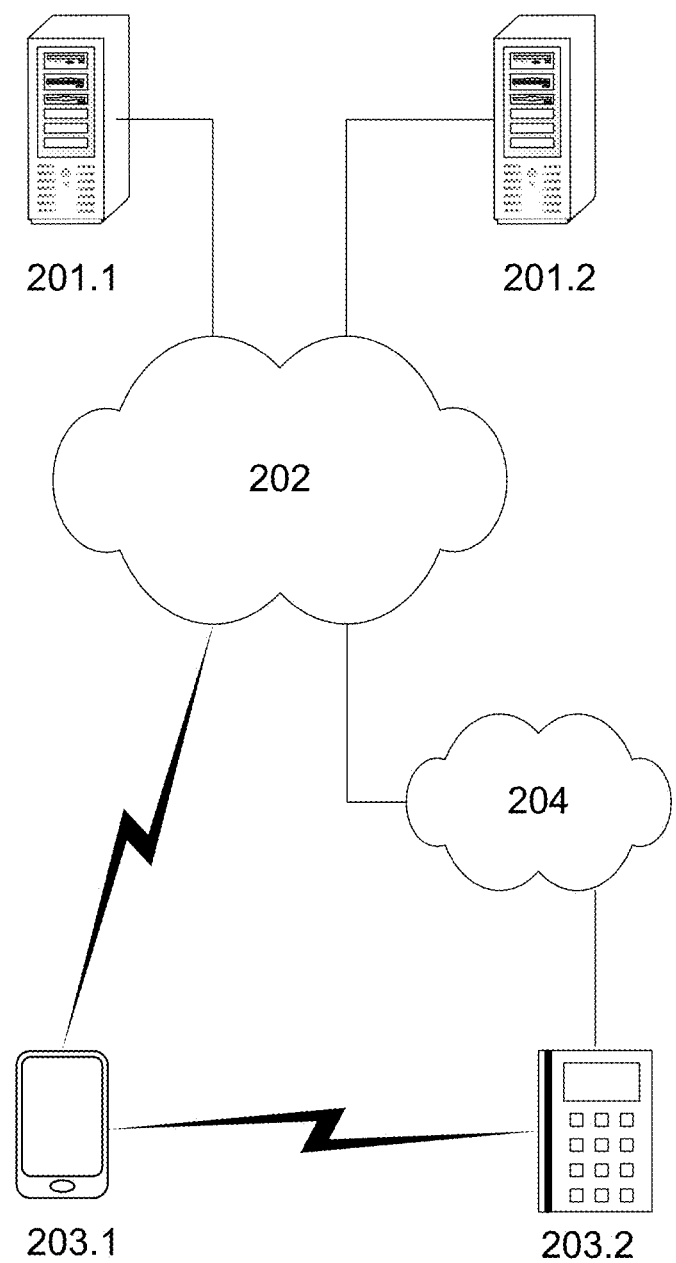
FIG. 5 is a schematic diagram of an example of a system configuration for facilitating a payment from a customer to a merchant.
Figure 6A:
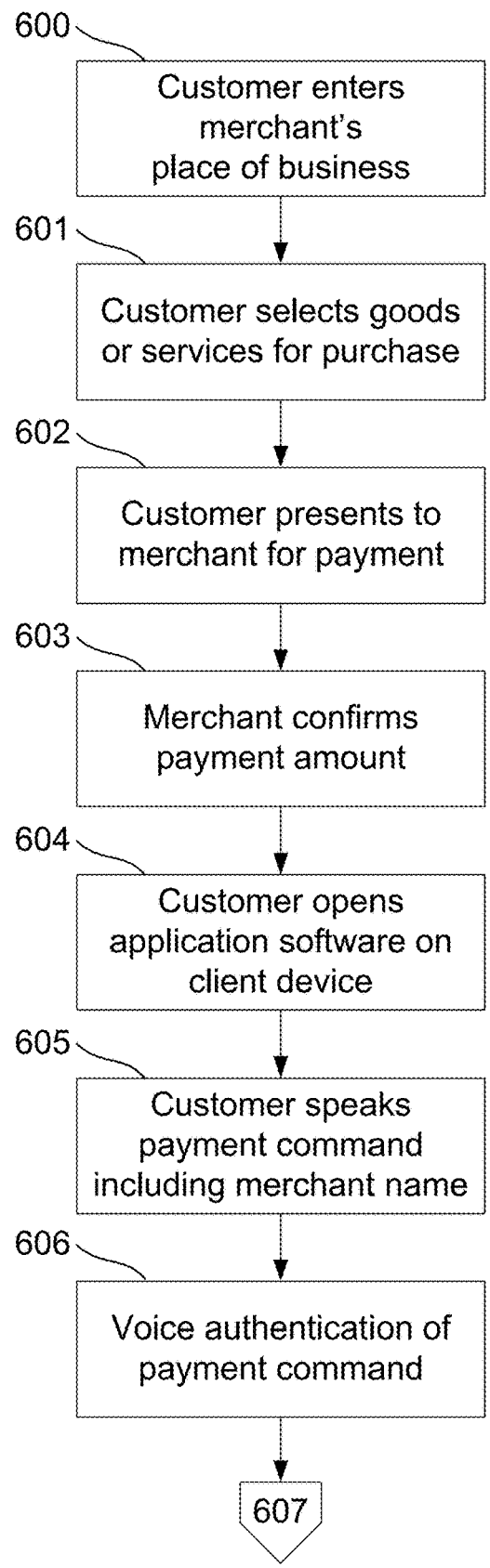
FIGS. 6A to 6D are a flow chart of a first example of a method of a customer making a payment to a merchant.
Figure 6B:
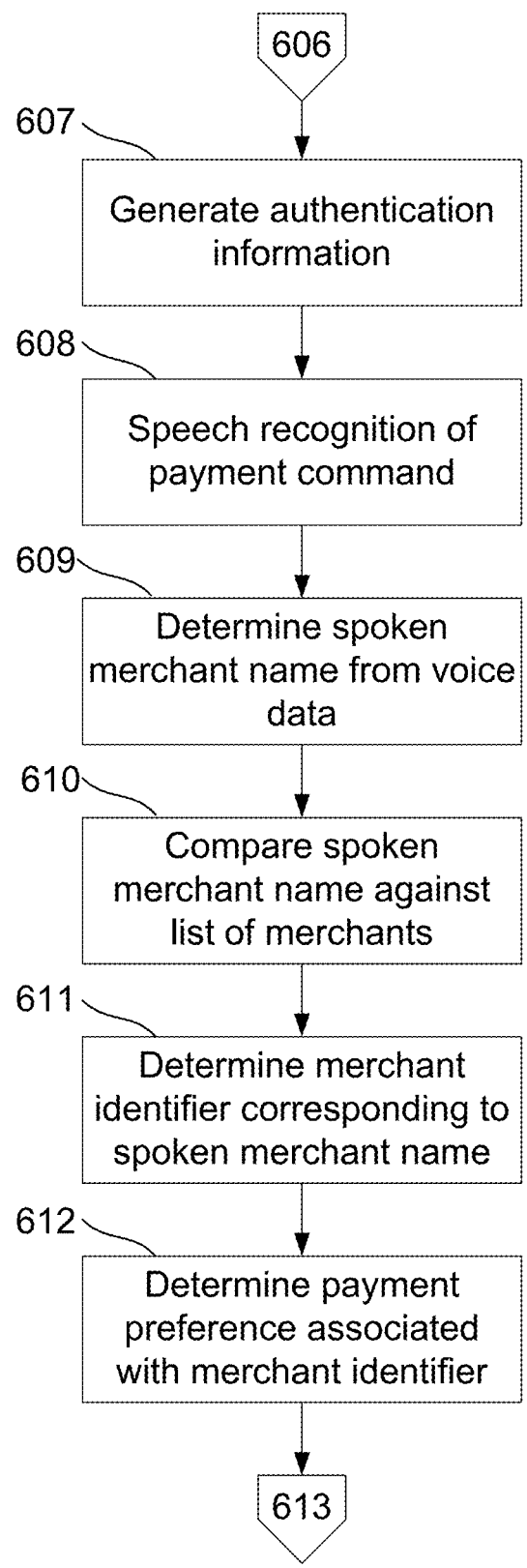
Figure 6C:
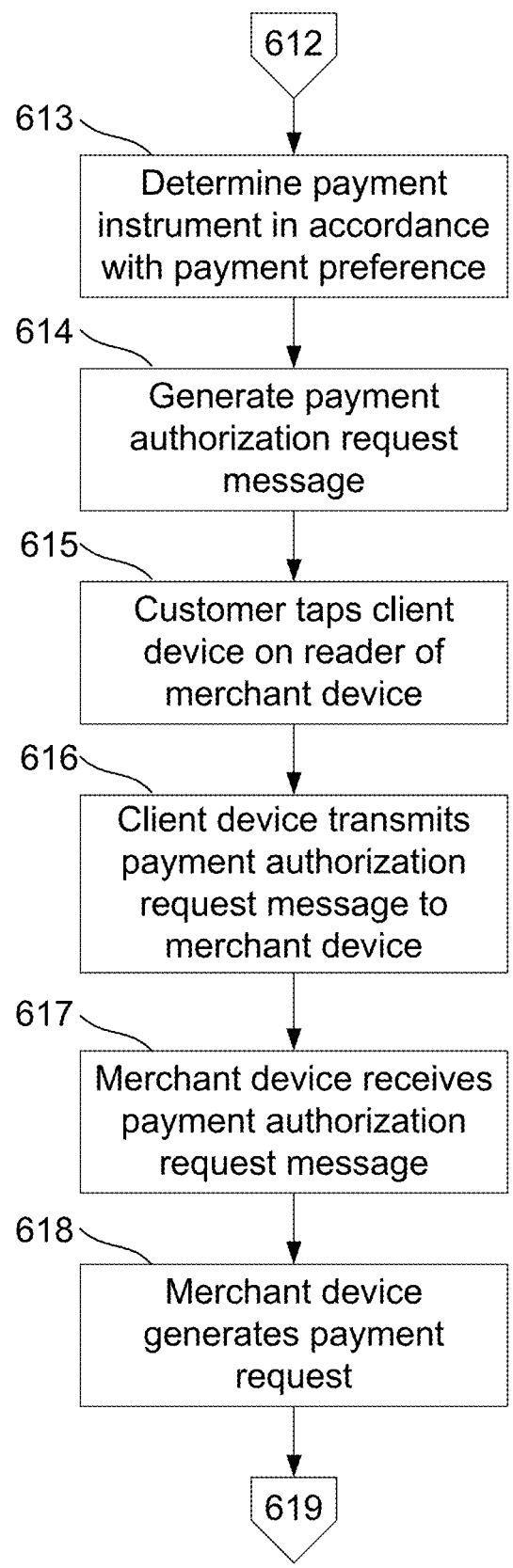
Figure 6D:
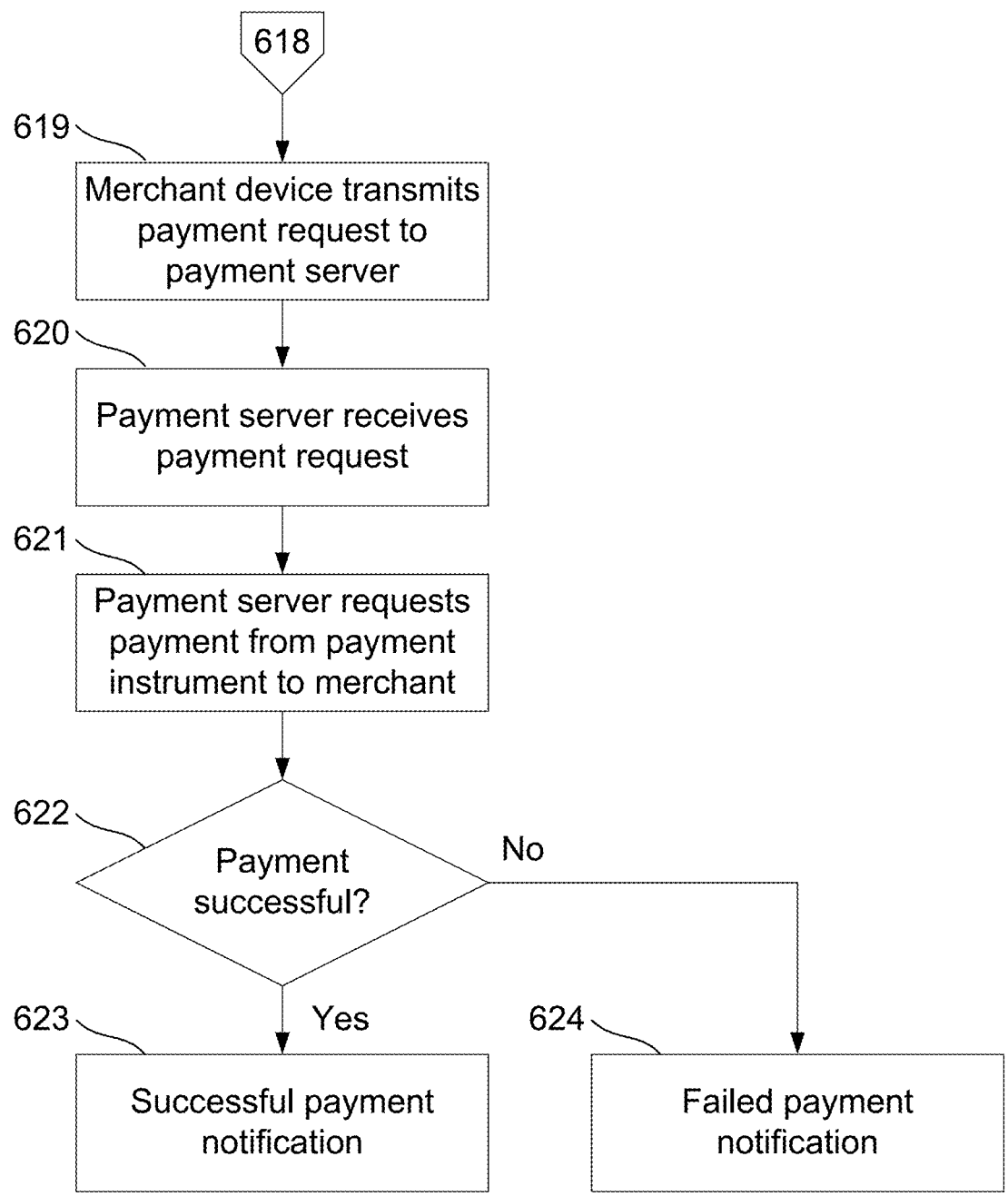
Figure 7A:
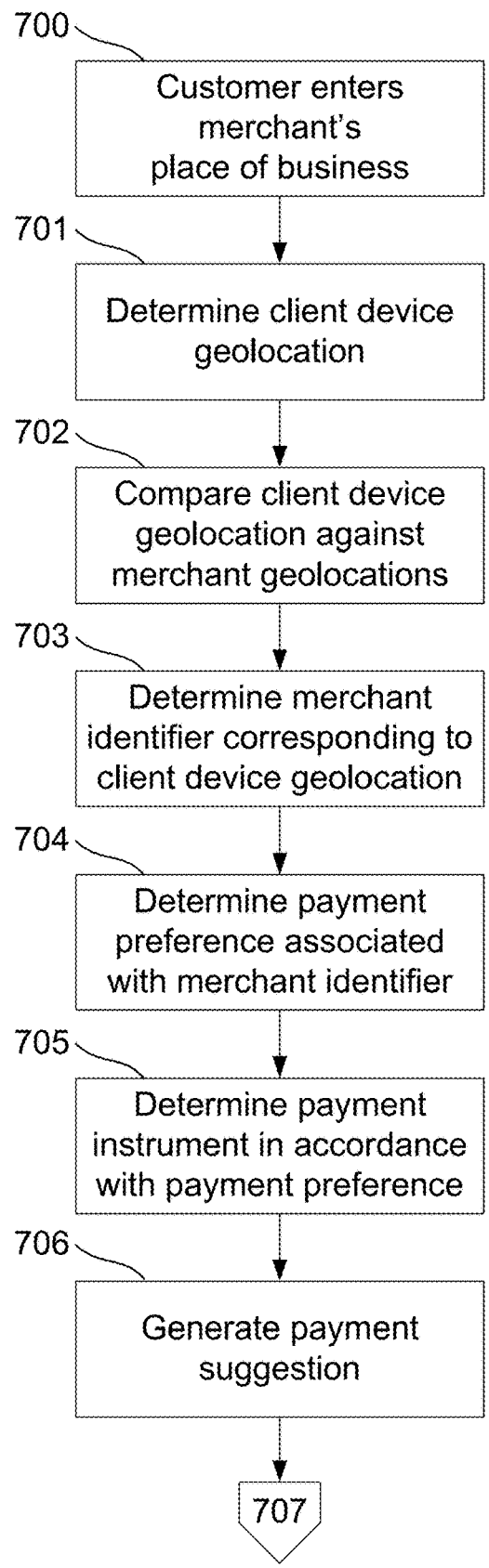
FIGS. 7A to 7D are a flow chart of a second example of a method of a customer making a payment to a merchant.
Figure 7B:
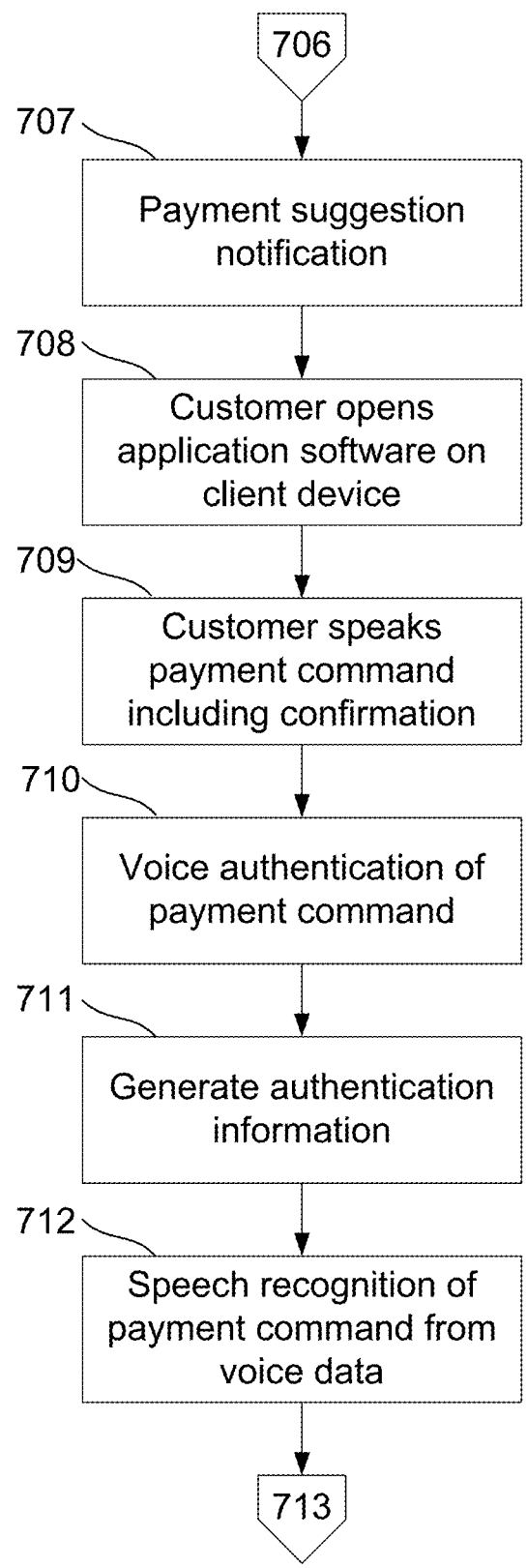
Figure 7C:
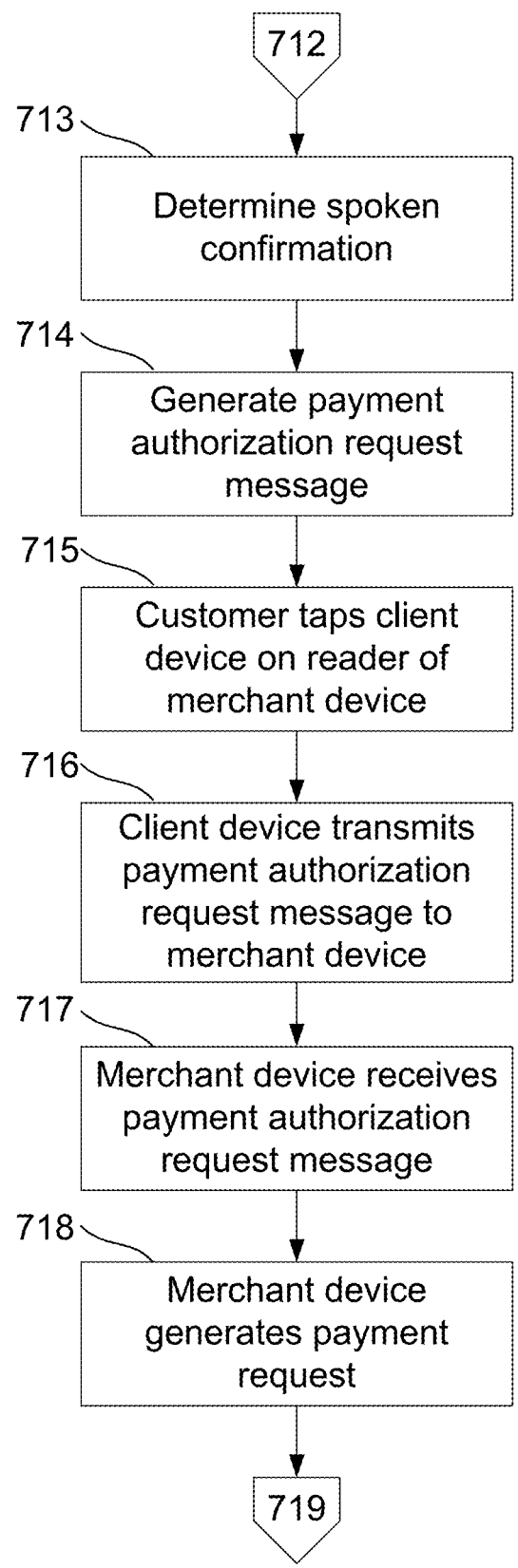
Figure 7D:
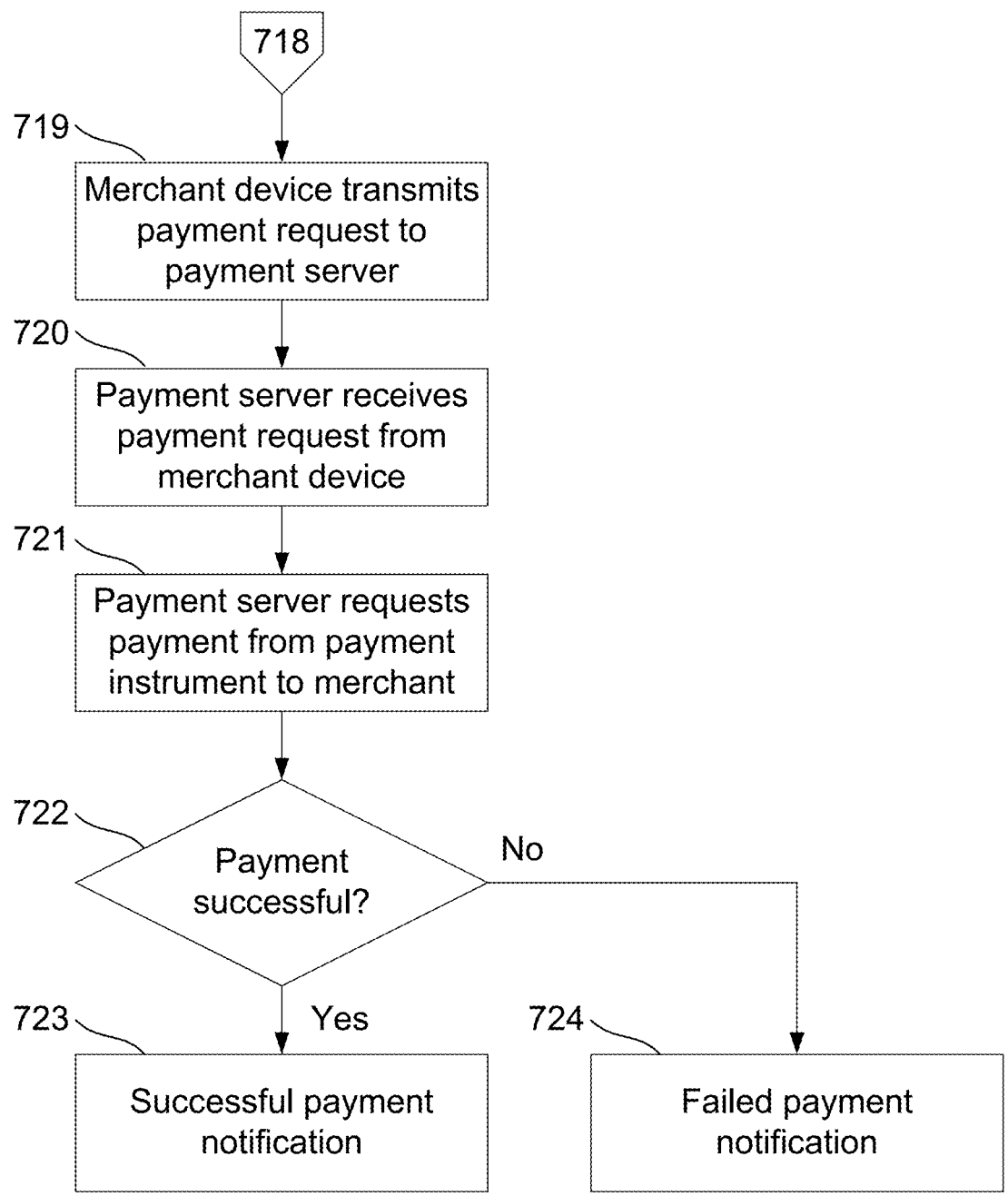

A particular example of a system configuration for facilitating a payment from the customer to the merchant, which is assumed to be used in the following detailed examples, will now be described with regard to FIG. 5.

In this example, the customer carries a client device 203.1 in the form of a smart phone and the merchant operates a merchant device 203.2 in the form of a point-of-sale terminal located in a place of business of the merchant. Both the client device 203.1 and the merchant device 203.2 are capable of wirelessly communicating when the client device 203.1 and the merchant device 203.2 are within suitably close range of one another. In this example, the wireless communication is assumed to be facilitated using NFC technology. Typically the client device 203.1 and the merchant device 203.2 will also be configured to connect to the Internet. In this case the client device 203.1 wirelessly connects to the Internet and has a data plan on a mobile network for allowing the consumption of mobile data via the Internet, whilst the merchant device 203.2 is wirelessly connected to a local area network 204 which is in turn connected to the Internet 202.

Each of the client device 203.1 and the merchant device 203.2 will typically execute application software for enabling the functionalities required to perform the method. The customer and the merchant will interact with their respective client device 203.1 and the merchant device 203.2 using the application software as follows.

The customer interacts with the client device 203.1 to provide a spoken payment command for initiating the payment. In some implementations, this may require the customer to unlock the client device 203.1 and access the application software before speaking the spoken payment command into a microphone of the client device 203.1. The customer may also interact with the client device 203.1, as required, to make selections of payment instruments as required, but this can also be achieved via spoken commands, as discussed above. When the customer wishes to finalize the payment, the customer can move the client device 203.1 into proximity with the merchant device 203.2 to allow the payment authorization request message to be transferred to the merchant device 203.2 using NFC wireless communication. The customer may also interact with the client device 203.1 to perform other tasks, such as initially setting payment preferences for a merchant, and reviewing or revising payment preferences at a later time as required.

The method does not require any specific merchant interactions with the merchant device 203.2, but suitable implementations of the merchant device 203.2 may allow the merchant to interact with the merchant device 203.2 to perform tasks, such as generating payment requests for customer orders, and potentially, performing other point-of-sale functionalities outside the scope of this application.

In this example, the system includes an application server 201.1 which may be configured to send and receive information to and from the client device 203.1 and the merchant device 203.2 to administer the payment process. For example, the application server 201.1 may be used to store merchant details and/or associated payment preferences in a central database for use in determining the merchant identifier and the payment instrument for a payment, rather than having these stored locally on the client device 203.1. However, it should be appreciated that an application server 201.1 may not be required in some implementations. In any event, the client device 203.1 and the merchant device 203.2 will usually be connected to the application server 201.1 via the Internet.

The client device 203.1 may transfer payment preferences to the application server 201.1 so that these can be centrally stored. The merchant device 203.2 may communicate with the application server 201.1 to request further details of the payment instrument in accordance with the indication of the payment instrument. The application software executed by each of the client device 203.1 and merchant device 203.2 will typically be configured to facilitate these and other information transfers. The customer or merchant may interact with the approval server via voice commands, a GUI (Graphical User Interface), or the like, presented on their respective processing systems 203, such as via the application software or optionally via a browser application that displays webpages hosted by the application server 201.1.

Depending on where the actual payment approval takes place and the payment instrument being used, at least one of the merchant device 203.2 and the application server 201.1 may communicate with a payment server 201.2 operated by a payment service provider, or the like, to actually cause the payment to be performed after it has been automatically approved in accordance with the method. This communication will typically also be achieved via the Internet.

However, it will be appreciated that the above described configuration assumed for the purpose of the following examples is not essential, and numerous other configurations may be used. It will also be appreciated that the partitioning of functionality between the processing systems 201, 203 may vary, depending on the particular implementation.

A first example of a method of a customer making a payment to a merchant using the above discussed techniques will now be described with regard to the flow chart of FIGS. 6A to 6D.

This example assumes that the customer's client device 203.1 is a smart phone having a suitable microphone for obtaining voice data of spoken commands from the customer, a suitable wireless communications capability, such as NFC for enabling mobile payments, and a data plan for consumption of mobile data and having a suitable version of the application software for facilitating the process installed, as discussed above. The customer is assumed to be already registered as a user of the application software, and is also assumed to have a mobile wallet containing one or more tokenized payment instruments (credit cards, debit cards, prepaid cards, and/or gift cards, for example) as mentioned earlier. Typically, when the customer initially registers as a user, the customer will set up the application software by connecting their tokenized mobile wallet to the application software in preparation for future payments.

This example also assumes that the merchant has already been registered with an acquiring bank to accept payments. As part of the registration process, merchant details for the merchant will typically be provided to the application server 201.1 and stored in a database 211. The registration process may take place by having the merchant interact with a merchant device 203.2 to input required merchant details. A merchant identifier may be associated with the merchant details to allow the application server 201.1 to identify the merchant as required in the implementation of the method.

In step 600, the customer enters the merchant's place of business, and selects goods or services for purchase in step 601. The customer presents to the merchant for payment in step 602. The merchant may process the customer's order of goods or services in a generally conventional manner, depending on the nature of the merchant's business. For instance, the merchant may process the customer's order using a suitably configured register or POS terminal, which may or may not be the merchant device 203.2 depending on the particular implementation.

In any event, the merchant will confirm a payment amount required from the customer at step 603. The payment amount may be confirmed to the customer verbally or displayed on a register, POS terminal, or the like. Upon confirmation of the payment amount, the customer will open the application software on their client device 203.1 to initiate the payment process at step 604.

In this example, the customer initiates the payment process by speaking a payment command including the merchant name at step 605. For example, to initiate a payment to the merchant "GV Movies" the customer may speak a payment command of "Pay at GV Movies" into a microphone of the client device 203.1. The client device 203.1 will thus obtain voice data of the spoken payment command and this may be stored on the client device 203.1 for further processing.

At step 606, voice authentication using the voice data of the spoken payment command may be performed. This will typically be performed locally using the client device 203.1, and may involve comparing at least part of the voice data of the spoken payment command against a locally stored voice print for the customer, which will usually be stored during the initial registration of the customer. In some alternative implementations the client device 203.1 may transfer the voice data of the spoken payment command or a partially processed version thereof to the application server 201.1 to allow the voice authentication to be performed by the application server 201.1. In any case, authentication information may be generated at step 607, which may be utilized at a later point in the method.

Speech recognition of the voice data of the payment command may be performed at step 608. As per the voice authentication, this may be performed locally in the client device 203.1 or remotely in the application server 201.1 depending on the particular implementation. In this example, the speech recognition is performed to determine the spoken merchant name at step 609. Known speech recognition techniques may be used to identify the merchant name in this step. In some cases, the speech recognition may utilize training data that is collected earlier by having the customer speak the merchant name, for instance, when setting payment preferences for the merchant.

In step 610, the spoken merchant name determined in the speech recognition step may be compared against a list of merchants. For instance, the list of merchants may correspond to any merchants for which the customer has set payment preferences, although it is not essential for the customer to have previously set payment preferences for every possible user, and the list of merchants may be compiled from other sources. In some examples, the application server 201.1 may store merchant details in a database including merchant details for all merchants for which payment preferences have been set by any customer. This allows the application server 201.1 to manage the merchant details centrally and can help to avoid duplication of merchant details for different customers.

Typically, the merchant details will be organized with regard to merchant identifiers, and in step 611, a merchant identifier corresponding to the spoken merchant name may be determined based on the comparison in step 610. In this example, the spoken merchant name of "GV Movies" included in the voice data of the spoken payment command will be used to determine the corresponding merchant identifier.

Next, step 612 involves determining a payment preference associated with the merchant identifier determined in the previous step. This assumes the customer has set a payment preference applicable to the determined merchant identifier. This does not necessarily require that the customer has specifically set a payment preference for the particular merchant, since the customer may set a general payment preference for a category or group of merchants that may apply to the particular merchant. In any event, each payment preference will usually be associated with one or more merchant identifiers such that the determined merchant identifier can be used to identify which payment preference will be applicable for the payment.

At step 613, a payment instrument may be determined in accordance with the payment preference. As mentioned previously, the payment preference will typically include an indication of a preferred payment instrument for use in payments with a merchant or category/group of merchants. The simplest form of payment preference will specify a single preferred payment instrument for use with a merchant identifier, in which case this step will involve a straightforward selection of the payment instrument as specified by the payment preference.

However, in some cases, the determination of a preferred payment instrument may be subject to conditions based on other parameters, such as the date/time of the payment, and if this is the case, then determining the payment instrument in accordance with the payment preference may also involve consideration of any relevant parameters that form conditions on the use of preferred payment instruments for payments to the merchant identifier. In this example, the merchant identifier for "GV Movies" has an associated payment preference that specifies to use a "POSB Everyday Card" for any payments except if these are on a Tuesday, in which case a "Capital Card" is to be used. Accordingly, assuming this example is not performed on a Tuesday, the "POSB Everyday Card" will be selected for use.

It should be appreciated that the above steps of determining the payment preference and the payment instrument may be performed by the client device 203.1 or the application server 201.1 depending on the particular implementation. Performing these steps in the client device 203.1 can reduce the need for the client device 203.1 to communicate with the application server 201.1 (typically via the Internet) and therefore may help to avoid issues due to poor Internet connectivity that may arise in some merchant's places of business. On the other hand, it may be desirable to have the payment preferences stored centrally to allow a customer to access the same payment preferences on different devices.

In any event, once the customer has been authenticated and the merchant identifier and payment instrument have been determined, then the payment authorization request message may be generated at step 614. Typically, the payment authorization request message will be generated locally in the client device 203.1, although this is not essential and the payment authorization request message could be generated in the application server 201.1 in some examples, and subsequently transferred to the client device 203.1. The payment authorization request message may be generated in the form of an electronic message including at least an indication of the determined payment instrument for the payment. In some examples, the payment authorization request message may optionally include at least some of the authentication information generated at step 607, although this is not essential, and in alternative examples, the authentication information may instead be provided to the application server 201.1 to allow this to be verified before the payment authorization request message can be generated.

At step 615, the customer may tap the client device 203.1 on an NFC reader of the merchant device 203.2, to cause the client device 203.1 to wirelessly transmit the payment authorization request message to the merchant device 203.2 at step 616. It will be appreciated that these steps can involve the same kind of action as performed in conventional mobile payment processes, and this is desirable to allow the method to be readily utilized by customers familiar with conventional mobile payment processes.

The merchant device 203.2 will receive the payment authorization request message at step 617, and will subsequently use this to generate a payment request for the payment at step 618. The payment request will typically be generated including a payment amount corresponding to the total amount of the customer order together with information derived from the payment authorization request message including the indication of the customer's payment instrument. The payment request may also include a merchant identifier or an indication of the merchant's account to allow the payment to be correctly performed in favour of the merchant.

The payment request is then transferred from the merchant device 203.2 to a payment server 201.2 at step 619. This may be a direct transfer, although in some implementations the payment request may be transferred via the application server 201.1. Upon receipt of the payment request at step 620, the payment server 201.2 may use the payment request to determine the customer's payment instrument that will be the source of funds for the payment and the merchant's account that will be the beneficiary of the payment, and the payment server 201.2 may then proceed to cause the payment to be performed at step 621.

In step 622, the payment server 201.2 will determine whether the payment has been successfully performed. In the event of a successful payment, a successful payment notification may be generated at step 623. This successful payment notification will typically be provided to merchant device 203.2, to allow this to be presented on a display of the POS terminal, or the like. In some cases, the merchant device 203.2 may also execute application software for communication with the application server 201.1, with the successful payment notification being delivered via the application server 201.1 and taking the form of a push notification provided by the application software.

In some examples the successful payment notification may also be delivered to the client device 203.1, such as via the application server 201.1. In the case of the client device 203.1, the successful payment notification may be provided via the application software to provide a seamless confirmation that the customer's payment to the merchant has been processed to completion.

If the payment is unsuccessful, the payment server 201.2 may instead provide a failed payment notification, at step 624, to the merchant device 203.2 and optionally the client device 203.1 in a similar manner as discussed for the successful payment notification. In this case, the customer and the merchant may agree to cancel the transaction or the customer may make another payment attempt, such as by using an alternative payment instrument. The failed payment notification may include an indication of why the payment was unsuccessful, to allow the customer to modify their next payment attempt accordingly.

It should be appreciated that the particular steps from transmission of the payment authorization request message to the merchant device onwards can generally be performed in accordance with known conventional techniques, and therefore a variety of alternative processes for actually causing the payment to be performed based on the payment authorization will be apparent to those skilled in the art.

The above discussed example with regard to FIGS. 6A to 6D represents one possible technique for implementing the method, but as mentioned previously, a range of techniques may be used particularly for determining the merchant identifier and payment instrument for the payment.

In order to illustrate other alternative techniques, a second example of a method of a customer making a payment to a merchant using the above discussed techniques will now be described with regard to the flow chart of FIGS. 7A to 7D. In particular, in this second example, the client device geolocation is used to assist in the determination of the merchant identifier.

It should be appreciated that portions of this second example will share similarities with the previously described first example and accordingly, steps similar to those described previously will only be discussed briefly with the understanding that the reader may refer to the more detailed discussions of the corresponding steps in the first example above.

As per the first example, this second example commences when the customer enters the merchant's place of business at step 700. However, this example involves determining the client device geolocation in step 701. This does not necessarily require any customer interactions with the client device 203.1 and may be performed by the application software as a background process. The application software executed on the client device 203.1 may interface with a geolocation module of the client device 203.1 to determine the client device geolocation. The client device geolocation can then be transferred to the application server 201.1.

At step 702, the client device geolocation may be compared against respective merchant geolocations for a plurality of merchants. This may be performed locally in the client device 203.1 or may alternatively involve the client device 203.1 transferring an indication of the client device geolocation to the application server 201.1 to allow the comparison to be made remotely. It will be appreciated that to enable this method merchant details need to be stored with respective merchant geolocations.

The comparison may be performed for only a subset of merchant identifiers which may be filtered based on a general geographical region, such as a city, suburb, or locality. In one example, the comparison is used to determine whether there are any nearby merchants based on the client device geolocation. This may involve determining whether the client device geolocation is within a distance threshold of any of the respective merchant geolocations. The distance threshold may be predetermined based on known geolocation accuracy parameters, and may be variable depending on the strength of a GPS signal of the client device 203.1, for example.

At step 703, a merchant identifier corresponding to the client device geolocation may be determined based on the comparison. In one example, if the comparison, in step 702, determines that there is only a single nearby merchant (e.g., if the client device geolocation is only within the distance threshold of one merchant geolocation), then the merchant identifier may be determined solely based on the client device geolocation. In other examples, it may not be possible to reliably resolve a single merchant identifier, such as if there are more than one merchants with merchant geolocations within the distance threshold. In such cases, the method may determine a most likely merchant identifier based on the client device geolocation, but may provide the customer with an opportunity to override this at a later stage.

It will be appreciated that the merchant identifier may be determined without requiring any input from the customer using other techniques. For example, the merchant identifier may be determined based on wireless communications between the client device 203.1 and the merchant device 203.2.

Step 704 involves determining a payment preference associated with the determined merchant identifier, using similar techniques as discussed previously for step 612 of the first example. Then, at step 705, a payment instrument is determined in accordance with the payment preference, in a similar manner as discussed for step 613 of the first example. Although the techniques used in this example to determine the payment preference and the payment instrument are similar as the first example, it should be understood that these steps are being performed prior to any spoken payment commands being received in this second example. Rather, these determinations are being made pre-emptively in this case.

At step 706, a payment suggestion is generated based on the determined merchant identifier and payment instrument. This payment suggestion may be provided to the customer in the form of a payment suggestion notification at step 707, which will typically be presented on the client device 203.1 and may additionally be accompanied by an audible and/or haptic alert. The payment suggestion may prompt the customer of the possibility of making a payment to the merchant corresponding to the determined merchant identifier using the payment instrument determined in accordance with the customer's payment preference for that merchant. This payment suggestion may be provided when the customer initially enters the merchant's place of business but may not be acted upon by the customer until the customer has completed a customer order.

When the customer is ready to make a payment with the merchant, the customer may open the application software on the client device 203.1 at step 708. Following this, at step 709 the customer may speak a payment command into the microphone of the client device 203.1, although in this example the payment command may simply involve a spoken confirmation of the payment suggestion rather than a spoken merchant name as in the previous example.

Voice authentication of the payment command may be performed in step 710 and authentication information may be generated based on the voice authentication in step 711, generally in a similar manner as per steps 606 and 607 in the previous example. Speech recognition of the payment command may then be performed in step 712 using similar techniques as discussed above for step 608, although in this case the speech recognition may simply be for the purpose of determining that the voice data of the spoken payment command included spoken confirmation, rather than to determine a spoken merchant name.

In the event that a spoken confirmation is determined by the speech recognition, at step 713, then the payment authorization request message may be generated at step 714 based on the payment suggestion. However, if the customer does not agree with the payment suggestion, the customer may override the payment suggestion by providing voice data of a spoken payment command including a spoken merchant name that is different to the suggested merchant and/or a spoken payment instrument that is different to the suggested payment instrument. This would lead to the method being carried out generally in accordance with the first example as described previously.

The subsequent steps of this second example may generally proceed as described for the first example. At step 715 the customer may tap the client device 203.1 on an NFC reader of the merchant device 203.2, to cause the client device 203.1 to transmit the payment authorization request message to the merchant device at step 716. Then, the merchant device will receive the payment authorization request message at step 717 and may generate the payment request based on the payment authorization request message at step 718. The merchant device 203.2 transmits the payment request to the payment server 201.2 at step 719. The payment server 201.2 receives the payment request at step 720 and then requests payment from the payment instrument of the customer to the merchant at step 721. As discussed above, if the payment is successful at step 722 this will lead to a successful payment notification at step 723, but if not, a failed payment notification will be provided at step 724.

Figure 8A:
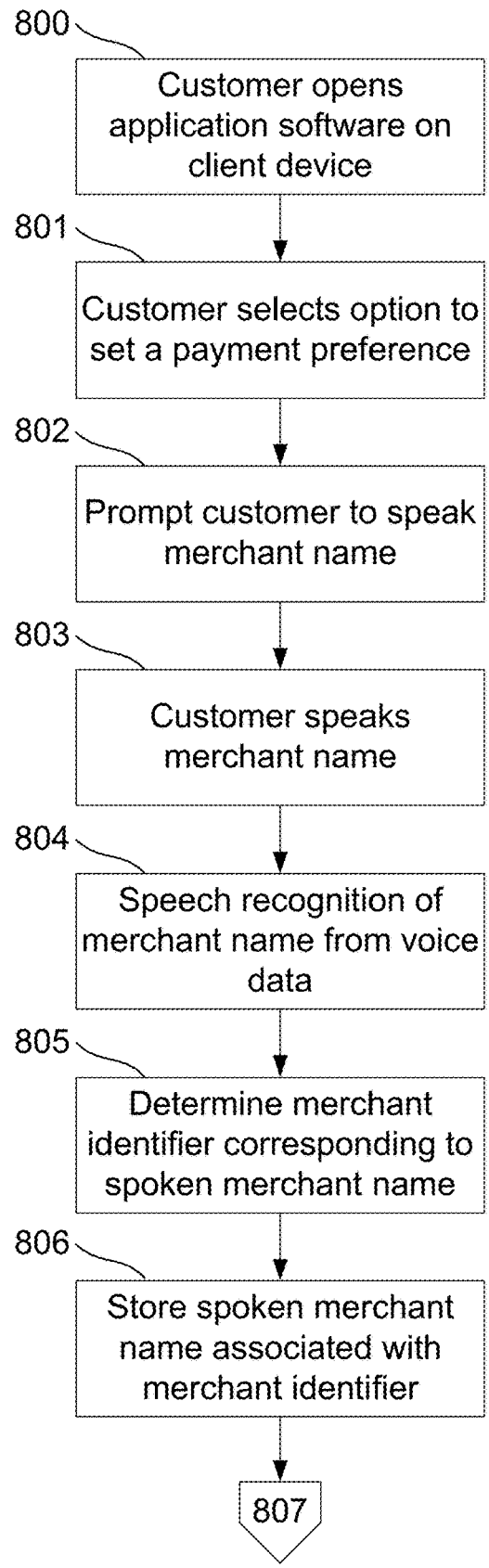
FIGS. 8A and 8B are a flow chart of an example of a method of a customer setting a payment preference for a merchant.
Figure 8B:
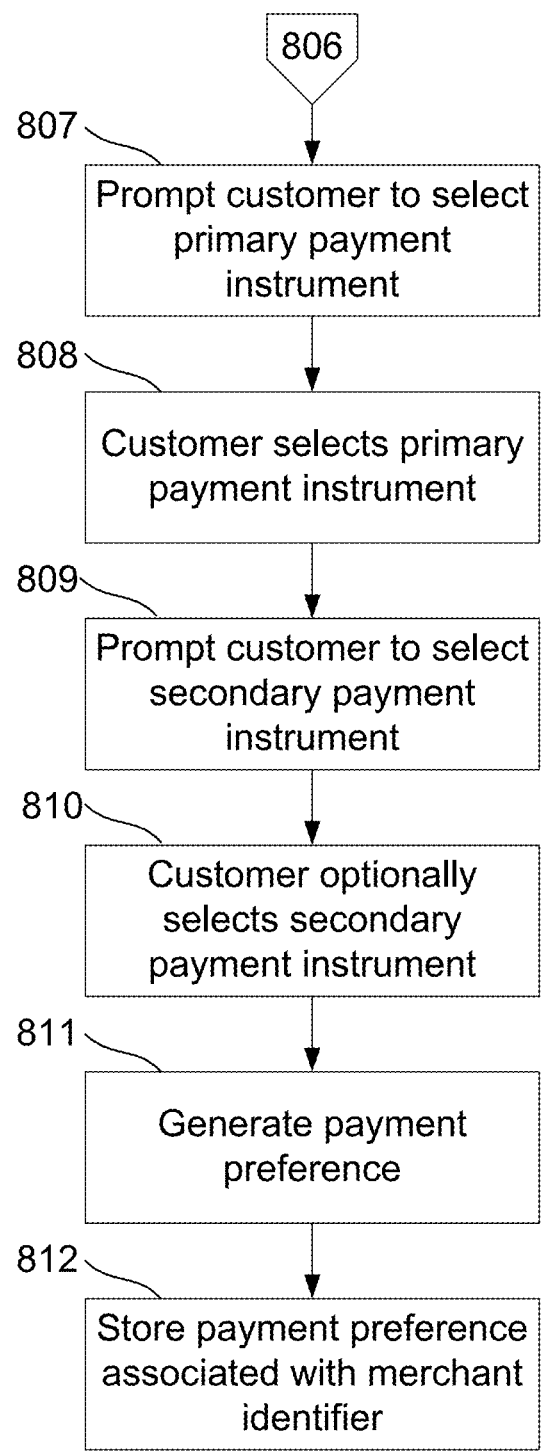

As discussed above, the method may use a payment preference for determining the payment instrument to be used for a payment to a merchant. Accordingly, an example of a method of a customer setting a payment preference for a merchant will now be described with regard to FIGS. 8A and 8B.

As per the previous examples, it is assumed that the customer has a suitably configured client device 203.1 upon which application software has been installed for enabling the functionalities of the method. It is also assumed that the customer is a registered user of the application software and has a mobile wallet associated with payment instruments of the customer that are available for payments.

In step 800, the customer opens the application software on the client device 203.1. The customer can interact with the application software via a graphical user interface to select an option to set a payment preference at step 801. In this example, at step 802 the application software prompts the customer to speak a merchant name for the payment preference. In response, at step 803 the customer may speak a merchant name for a merchant which the customer wishes to set a payment preference.

In step 804, speech recognition is performed on voice data of the spoken merchant name, and this is used to determine a merchant identifier corresponding to the voice data of the spoken merchant name at step 805. It will be appreciated that this may use similar techniques as discussed above for other speech recognition steps in the previous examples. The method may also involve storing the spoken merchant name, or a representation thereof, in association with the merchant identifier at step 806. This may be used to train the speech recognition functionality or to allow a direct comparison of the stored spoken merchant name and future instances of the customer speaking the merchant name.

Upon determining the merchant identifier, at step 807 the application software may prompt the customer to select a primary payment instrument for payments to the identified merchant. Then, at step 808, the customer may select a primary payment instrument. This may involve the customer interacting with a graphical user interface to select a desired payment instrument from the customer's mobile wallet. In some examples, the payment instrument may be selected by speaking an indication of a payment instrument and having speech recognition performed on the voice data of the spoken indication of the payment instrument. At step 809, the application software may prompt the customer to select a secondary payment instrument. Then, at step 810, the customer may optionally select a secondary payment instrument. The customer may also optionally specify conditions for determining particular situations in which the different payment instrument should be used.

In any event, once the customer has selected one or more payment instruments for payments to the identified merchant, at step 811 the payment preference may be generated, and the payment preference may subsequently be stored in association with the merchant identifier at step 812. Accordingly, the payment preference will be available to allow the customer's preferred payment instrument to be determined based on the merchant identifier when the customer wishes to make a payment to the merchant.

It will be appreciated that this ability to generate payment preferences may allow an intelligent mobile wallet to be provided, which is capable of learning the customer's preferences based on straightforward voice interactions. In some implementations, the application software for enabling the functionalities of the above described method may be integrated with a mobile wallet.

In some alternative examples, the payment preference may be set based on a customer selection of a payment instrument in an active transaction with a particular merchant. This may enhance the learning capability of the intelligent mobile wallet. For instance, the customer may perform a conventional contactless mobile payment with a particular merchant, including manual selection of a payment instrument. Upon completion of the transaction, the application software may store a merchant identifier and the payment instrument used, along with other details as may be required depending on the implementation, such as a category, merchant name or merchant geolocation.

To further illustrate possible usage scenarios, some examples of customer interactions with the application software will now be described. These will include a number of examples of different ways to set payment preferences and a number of examples of different ways to initiate a payment to a merchant.

In a first example of setting a payment preference, the customer has opened the application software and has opted to set a payment preference. The application software presents a prompt of "Please speak the merchant name of category". In response, the customer speaks the merchant name, "Starbucks®" in this example. It will be appreciated that speech recognition of this spoken merchant name may be performed to determine a merchant identifier as discussed above. Then, the application software presents a prompt of "Which primary card would you like to use?" In this example, the customer responds by speaking "POSB Everyday Mastercard®", which corresponds to one of the customer's available payment instruments. The application software follows this by presenting a prompt of "Any secondary card?", and the customer responds by speaking "SC Manhattan Card". The application software will then generate a payment preference for the merchant identifier for Starbucks® so that the POSB Everyday Mastercard® is to be used as the default payment instrument for any purchases, but the SC Manhattan Card may be used as a secondary payment instrument.

In a second example of setting a payment preference, the customer will set a condition on one of the payment instruments. The customer opens the application software and opts to set a payment preference. The application software once again presents a prompt of "Please speak the merchant name of category". In response, the customer speaks the merchant name, "GV Movies" in this example. Then, the application software presents a prompt of "Which primary card would you like to use?" In this example, the customer responds by speaking "POSB Everyday Mastercard®" as per the previous example. The application software follows this by presenting a prompt of "Any secondary card?", and the customer responds in this case by speaking "DBS Capital Card on Tuesdays". Speech recognition will be performed on the voice data of this spoken command to determine that this includes both an identification of the DBS Capital Card payment instrument along with the condition that this should only be used for payments performed on Tuesdays. Accordingly, in this example, the application software will generate a payment preference for the merchant identifier for GV Movies so that the POSB Everyday Mastercard® is to be used as the default payment instrument for purchases except on Tuesdays, when the DBS Capital Card is to be used.

In a third example of setting a payment preference, the customer will set a payment preference for payments to a transit operator as opposed to a merchant having a specific place of business. The customer opens the application software and opts to set a payment preference. The application software once again presents a prompt of "Please speak the merchant name of category". In this case, the customer speaks "Transit" which will be determined through speech recognition as indicating the transit operator. Then, the application software presents a prompt of "Which primary card would you like to use?" In this example, the customer responds by speaking "Passion POSB Card". The application software follows this by presenting a prompt of "Any secondary card?", and the customer responds in this case by speaking "No" to thereby decline setting any secondary card preference. Accordingly, in this example, the application software will generate payment preferences for the local transit operator so that the Passion POSB Card is to be used for any transit related payments.

In a fourth example of setting a payment preference, the customer will set a payment preference for a category as opposed to a specific merchant. The customer opens the application software and opts to set a payment preference. The application software once again presents a prompt of "Please speak the merchant name of category". In this case, the customer speaks "Food" to indicate a category for the payment preference. It will be appreciated that merchant details stored for each merchant may include an indication of one or more categories applicable to the merchant, which can thus allow payment preferences to be set for broad categories rather than particular merchants. Then, the application software presents a prompt of "Which primary card would you like to use?" In this example, the customer responds by speaking "DBS Platinum". The application software follows this by presenting a prompt of "Any secondary card?", and the customer responds in this case by speaking "No" to thereby decline setting any secondary card preference. Accordingly, in this example the application software will generate payment preferences for merchant identifiers corresponding to the Food category so that the DBS Platinum card is to be used for any Food related payments.

In a first example of initiating a payment, the customer wishes to make a payment in a merchant's place of business and therefore opens the application software and speaks a payment command of "Pay at GV Movies". The application software will perform voice authentication and speech recognition as described above, to authenticate the customer and determine from the voice data, the spoken merchant name of GV Movies. Then, the application software will check the list of merchants for which the customer has set payment preferences and will determine the merchant identifier corresponding to GV Movies, and retrieve the associated payment preference. In this case, the payment preference for GV Movies specifies that the DBS Capital Card is to be used if the day is Tuesday, otherwise the POSB Everyday Mastercard® is to be used. Assuming the day is not a Tuesday, the POSB Everyday Mastercard® will be selected for the payment. Then, when the customer taps their client device 203.1 on the reader of the merchant device 203.2, the transaction will be performed using the POSB Everyday Mastercard®.

In a second example of initiating a payment, the customer will use the intelligent mobile wallet for transit payments, such as for bus or subway travel. The customer opens the application software and speaks a payment command of "Pay at Transit". The application software will perform voice authentication and speech recognition to authenticate the customer and determine from the voice data, the spoken merchant name of Transit. Then, the application software will check the list of merchants for which the customer has set payment preferences and will determine the merchant identifier corresponding to the local transit operator, and retrieve the associated payment preference. In this case, the payment preference for transit specifies that the Passion POSB Card is to be used for all transit related payments. The customer may tap their client device 203.1 on the reader of a merchant device 203.2 provided by the transit operator, and enter a bus or train. The application software will retain the card information until the customer completes their trip. At the end of the trip, the customer may tap their client device 203.1 on the reader of a merchant device 203.2 provided by the transit operator, to cause the payment to be finalized using Passion POSB Card.

In a third example of initiating a payment, the payment instrument determined according to the customer's payment preference may be overridden by the application software if a better offer is identified for an alternative payment instrument. The customer wishes to make a payment in a merchant's place of business and therefore opens the application software and speaks a payment command of "Pay at Starbucks®" in this case. The application software will perform voice authentication and speech recognition as described above, to authenticate the customer and determine, from the voice data, the spoken merchant name of Starbucks®. Then, the application software will check the list of merchants for which the customer has set payment preferences and will determine the merchant identifier corresponding to Starbucks®, and retrieve the associated payment preference. In this case, the payment preference for Starbucks® specifies that the POSB Everyday Mastercard® is to be used as the primary payment instrument, although the SC Manhattan Card may be used as a secondary payment instrument. Although the POSB Everyday Mastercard® should be used by default, the application software may use the merchant identifier to search any other applicable offers that may be available if any other payment instruments are used with the identified merchant. In this case, it is found that the secondary payment instrument of the SC Manhattan Card provides greater discounts, so the application software presents a notification to the customer of "Found greater discounts with SC Manhattan Card, would you like to use this?" In this example, the customer agrees to take advantage of the greater discounts, and responds by speaking "Yes", which causes the application to select the SC Manhattan Card. Then, when the customer taps their client device 203.1 on the reader of the merchant device 203.2, the transaction will be performed using the SC Manhattan Card.

In a fourth example of initiating a payment, a payment suggestion will be determined based on the client device geolocation in advance of the customer initiating the payment. The customer enters the merchant's place of business, in this case Starbucks®, and the application software determines that the client device geolocation indicates that the customer is at Starbucks®. Accordingly, the application software will check the list of merchants for which the customer has set payment preferences and will determine the merchant identifier corresponding to Starbucks®, and retrieve the associated payment preference. The application software may also use the merchant identifier to search any other applicable offers that may be available if any other payment instruments are used with the identified merchant. In any event, the application software can determine a payment instrument to suggest for the payment with Starbucks®. In this case, the SC Manhattan Card is selected for similar reasons as discussed above. The application software will cause a notification to be presented on the client device of "You are at Starbucks®, would you like to pay?" When the customer is ready to make a payment, the client can open the application software and respond to the notification by speaking "Yes—Pay". The application software will perform voice authentication and speech recognition to authenticate the customer and determine that the voice data of the spoken payment command includes spoken confirmation to proceed with the payment. Then, when the customer taps their client device 203.1 on the reader of the merchant device 203.2, the transaction will be performed using the SC Manhattan Card.

Although the above examples mainly focus on mobile payments to a merchant in the merchant's place of business, it should be appreciated that the method may also be applied to other payment scenarios. For instance, the method can also be deployed for online transactions, where the preferred payment instrument can be selected based on similar criteria. In such cases, the client device may be used to access a merchant's website, and the merchant device may be a website server hosting the merchant's website. The customer may still initiate the payment using voice data of a spoken payment command which may be used at least in part for authentication and to determine the merchant identifier and payment instrument. Then, the payment authorization request message can be generated and transferred to the merchant device via the internet rather than using NFC communications as in the mobile payment examples. In any event, the payment authorization request message may be used by the merchant device to cause the payment to be performed using the customer's preferred payment instrument.

In any event, it will be appreciated that the methods described above can provide significant advantages in the facilitation of payments from a customer to a merchant, by removing the need for the customer to remember the best payment instrument for each payment scenario or provide separate authentication details. Particular implementations may also provide enhanced functionalities for suggesting the best payment instrument based on available offers, and to pre-emptively suggest payment parameters so that the customer only needs to provide a spoken confirmation to proceed with the payment as suggested.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the disclosure broadly appearing before described.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A client device for facilitating a payment from a customer to a merchant, the client device comprising a processor configured to:
   obtain voice data indicative of a spoken payment command from the customer;
   cause authentication of the customer to be performed based on voice authentication of the spoken payment command against a voice print of the customer stored locally on the client device;
   determine a merchant identifier based on speech recognition of at least part of a spoken merchant category obtained from the customer as part of the spoken payment command;
   determine a payment instrument of the customer;
   generate a payment authorization request message including an indication of the payment instrument; and
   transmit the payment authorization request message to a merchant device of the merchant, the merchant device responding to the payment authorization request message by causing the payment from the payment instrument of the customer to the merchant to be performed in accordance with the payment authorization request message.

2. The client device according to claim 1, wherein the processor is further configured to determine the payment instrument by selecting the payment instrument from a plurality of available payment instruments.

3. The client device according to claim 2, wherein the processor is configured to select the payment instrument based on one or more of:
   a customer selection of the payment instrument as part of the spoken payment command;
   a payment preference associated with the merchant identifier; and
   an assessment of any offers associated with the merchant identifier for the available payment instruments.

4. The client device according to claim 2, wherein the processor is configured to:
   select a first payment instrument in accordance with a payment preference associated with the merchant identifier;
   select a second payment instrument of the customer based on an assessment of any offers associated with the merchant identifier for the available payment instruments; and
   determine the payment instrument based on a customer selection of one of the first and second payment instruments.

5. The client device according to claim 1, wherein the processor is further configured to transmit the payment authorization request message to the merchant device via wireless communication between the client device and merchant device.

6. The client device according to claim 1, wherein the merchant device responds to the payment authorization request message by generating a payment request based on the payment authorization request message and a payment amount for the payment; and
   wherein the merchant device causes the payment to be performed by providing the payment request to a payment server.

7. The system comprising the client device of claim 1, the system further comprising the merchant device;
   wherein the merchant device is configured to:
      receive the payment authorization request message from the client device;
      generate, in response to the payment authorization request message, a payment request based on the payment authorization request message and a payment amount for the payment; and
      transmit the payment request to a payment server to cause the payment from the payment instrument of the customer to the merchant to be performed in accordance with the payment request.

8. A client device for facilitating a payment from a customer to a merchant, the client device comprising a processor configured to:
   obtain voice data indicative of a spoken payment command from the customer;
   cause authentication of the customer to be performed based on voice authentication of the spoken payment command against a voice print of the customer stored locally on the client device;
   determine a merchant identifier based on speech recognition of a spoken confirmation obtained from the customer as part of the spoken payment command;
   determine a payment instrument of the customer;

generate a payment authorization request message including an indication of the payment instrument; and transmit the payment authorization request message to a merchant device of the merchant, the merchant device responding to the payment authorization request message by causing the payment from the payment instrument of the customer to the merchant to be performed in accordance with the payment authorization request message.

9. The client device according to claim 8, wherein the processor is further configured to:

present a payment suggestion to the customer; and obtain the spoken confirmation from the customer in response to the payment suggestion; and wherein the payment suggestion includes:

a suggested merchant identifier; and an indication of a payment instrument of the customer associated with the suggested merchant identifier.

10. The client device according to claim 9, wherein the processor is further configured to:

determine the suggested merchant identifier based on a client device geolocation; and select the suggested merchant identifier from a plurality of merchant identifiers each being associated with a respective merchant geolocation, based on a comparison between the client device geolocation and the respective merchant geolocations.

11. A method for facilitating a payment from a customer to a merchant, the method being performed using a client device of the customer, the method comprising:

obtaining, by the client device, voice data indicative of a spoken payment command from the customer;

causing authentication of the customer to be performed based on voice authentication of the spoken payment command against a locally stored voice print of the customer;

determining a merchant identifier for the merchant based at least in part on the spoken payment command;

determining a payment instrument of the customer;

generating a payment authorization request message including an indication of the payment instrument;

transmitting the payment authorization request message to a merchant device of the merchant;

receiving, by the merchant device, the payment authorization request message from the client device;

generating, by the merchant device, in response to the payment authorization request message, a payment request based on the payment authorization request message and a payment amount for the payment; and transmitting, by the merchant device, the payment request to a payment server to cause the payment from the payment instrument of the customer to the merchant to be performed in accordance with the payment request.

* * * * *